US012671820B2

(12) United States Patent
Martin-Cocher et al.

(10) Patent No.: US 12,671,820 B2
(45) Date of Patent: Jun. 30, 2026

(54) SIGNALING FOR GREEN METADATA

(71) Applicant: InterDigital CE Patent Holdings, SAS, Paris (FR)

(72) Inventors: Gaëlle Martin-Cocher, Toronto (CA); Srinivas Gudumasu, Montreal (CA); Edouard Francois, Bourg des Comptes (FR); Franck Aumont, Vern sur Seiche (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 17 days.

(21) Appl. No.: 18/700,547

(22) PCT Filed: Oct. 14, 2022

(86) PCT No.: PCT/EP2022/078613
§ 371 (c)(1),
(2) Date: Apr. 11, 2024

(87) PCT Pub. No.: WO2023/062180
PCT Pub. Date: Apr. 20, 2023

(65) Prior Publication Data
US 2024/0414353 A1 Dec. 12, 2024

(30) Foreign Application Priority Data
Oct. 14, 2021 (EP) ..................................... 21306440

(51) Int. Cl.
H04N 19/156 (2014.01)
H04N 19/70 (2014.01)

(52) U.S. Cl.
CPC ........... H04N 19/156 (2014.11); H04N 19/70 (2014.11)

(58) Field of Classification Search
CPC ................. H04N 19/156; H04N 19/70; H04N 21/23439; H04N 21/25833;
(Continued)

(56) References Cited

U.S. PATENT DOCUMENTS

2015/0032857 A1 1/2015 Hamm et al.
2016/0105675 A1* 4/2016 Tourapis .............. H04N 19/196
375/240.02
(Continued)

FOREIGN PATENT DOCUMENTS

EP 3528450 A1 8/2019

OTHER PUBLICATIONS

"Information Technology—MPEG Systems Technologies—Part 11: Energy-Efficient Media Consumption (Green Metadata)", International Organization for Standardization, ISO/IEC SoDIS 23001-11, Apr. 26, 2013, 54 pages (Year: 2013).*
(Continued)

*Primary Examiner* — Maria E Vazquez Colon
(74) *Attorney, Agent, or Firm* — Condo Roccia Koptiw LLP

(57) ABSTRACT
A method comprising: executing a streaming session establishment process allowing establishing a streaming session between two peers in a network, wherein the streaming session establishment process comprises receiving (404) information allowing controlling a power consumption of a decoding process applied for decoding a stream representative of a content to be streamed in the streaming session.

10 Claims, 8 Drawing Sheets

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

| V = 2 | P | FMT | PT | Length |
|---|---|---|---|---|

| SSRC of Packet Sender |
|---|

| SSRC of Media Source |
|---|

Feedback Control Information (FCI)

(58) Field of Classification Search
     CPC ......... H04N 21/26258; H04N 21/6437; H04N
                 21/64769; H04N 21/4436; H04L 65/1069;
                 H04L 65/1104; H04L 65/1108; H04L
                 65/612; H04L 65/65; H04L 65/80
     See application file for complete search history.

(56)                    References Cited

U.S. PATENT DOCUMENTS

| | | |
|---|---|---|
| 2017/0208335 A1 | 7/2017 | Ramamurthy et al. |
| 2023/0093017 A1* | 3/2023 | He ........................ H04N 19/156 |
| | | 375/240.12 |

OTHER PUBLICATIONS

Wenger et al., "Codec Control Messages in the RTP Audio-Visual Profile with Feedback (AVPF)", Network Working Group, Request for Comments: 5104, Category: Standards Track, Feb. 2008, 64 pages.

"Information Technology—High efficiency Coding and Media Delivery in Heterogeneous Environments—Part 2: High Efficiency Video Coding", International Organization for Standardization, ISO/IEC JTC 1/SC 29/WG 11 N17661, ISO/IEC DIS 23008-2:201x, 4th Edition, Apr. 20, 2018, 874 pages.

"Infrastructure of audiovisual services—Coding of moving video—Versatile Video Coding", International Telecommunication Union (ITU), ITU-T Telecommunication Standardization Sector of ITU, Series H: Audiovisual and Multimedia Systems, Recommendation ITU-T H.266, Aug. 2020, 516 pages.

Zhao et al., "RTP Payload Format for Versatile Video Coding (VVC)", draft-ietf-avtcore-rtp-vvc-02, Internet Draft, Standards Track, Jul. 11, 2020, 43 pages.

Pantos et al., "HTTP Live Streaming", Independent Submission, Request for Comments: 8216 Category: Informational, Aug. 2017, 60 pages.

Andreasen F., "Session Description Protocol (SDP) Capability Negotiation", Internet Engineering Task Force (IETF), Request for Comments: 5939, Category: Standards Track, Sep. 2010, 77 pages.

Josefsson S., "The Base16, Base32, and Base64 Data Encodings", Network Working Group, Request for Comments: 4648, Obsoletes: 3548, Oct. 2006, 18 pages.

Herglotz et al., "Proposed CD text of Green MPEG 3rd edition specification", International Organization for Standardization, ISO/IEC JTC 1/SC 29/WG 3, m57978, Online meeting, Oct. 2021, 95 pages.

Tourapis et al., "H.264/14496-10 AVC Reference Software Manual", Joint Video Team (JVT) of ISO/IEC MPEG & ITU-T VCEG (ISO/IEC JTC1/SC29/WG11 and ITU-T SG16 Q.6), Document No. JVT-AE010, 31st Meeting: London, Great Britain, Jun. 28, 2009, 90 pages.

Ott et al., "Extended RTP Profile for Real-time Transport Control Protocol (RTCP)-Based Feedback (RTP/AVPF)", Network Working Group, Request for Comments: 4585, Category: Standards Track, Jul. 2006, 51 pages.

"Information technology, MPEG systems technologies, Part 10: Carriage of timed metadata metrics of media in ISO base media file format", International Organization for Standardization, International Standard ISO/IEC 23001-10, Second edition, Apr. 2020, 28 pages.

Pantos et al., "HTTP Live Streaming 2nd Edition", draft-pantos-hls-rfc8216bis-09, Internet Engineering Task Force (IETF), Informational Internet-Draft, Apr. 27, 2021, 168 pages.

"Information Technology—MPEG Systems Technologies—Part 11: Energy-Efficient Media Consumption (Green Metadata)", International Organization for Standardization, ISO/IEC 1/SC 29, ISO/IEC SoDIS 23001-11, Apr. 26, 2013, 54 pages.

Handley, et al., "SDP: Session Description Protocol", Network Working Group, Request for Comments: 4566, Obsoletes: 2327, 3266, Category: Standards Track, Jul. 2006, pp. 1-49.

Schulzrinne, et al., "RTP Profile for Audio and Video Conferences with Minimal Control", Network Working Group, Request for Comments: 3551, Obsoletes: 1890, Category: Standards Track, Jul. 2003, pp. 1-44.

Schulzrinne, et al., "RTP: A Transport Protocol for Real-Time Applications", Network Working Group, Request for Comments: 3550, Obsoletes: 1889, Category: Standards Track, Jul. 2003, pp. 1-89.

* cited by examiner

10

11

Client

Server

Peer A

STUN
Server

Signaling
Server

Peer B

SIGNALING FOR GREEN METADATA

CROSS REFERENCE TO RELATED APPLICATIONS

This application is a U.S. National Stage Application under 35 U.S.C. § 371 of International Patent Application No. PCT/EP2022/078613, filed Oct. 14, 2022, which is incorporated herein by reference in its entirety.

This application claims priority to European Application No. 21306440.5, filed Oct. 14, 2021, which is incorporated herein by reference in its entirety.

TECHNICAL FIELD

At least one of the present embodiments generally relates to a method and an apparatus for signaling information allowing controlling an energy consumed by a streaming application.

BACKGROUND

The last twenty years have seen a deep change in the way people are consuming multimedia data. Indeed, from a storage device-based model where multimedia data were stored on CD, DVD, blue ray or hard-disc drives, we moved to a streaming based model wherein multimedia data are streamed to a user with only a partial and temporary storage of the multimedia data on a user device. Streaming applications (e.g Free VoD, SVoD, Cloud Gaming, . . . ), because of their ease of use, have increased the possibilities of accessing multimedia contents at any time and anywhere, and in particular to video contents.

Energy consumption of video streaming applications becomes therefore a key issue. End devices (smartphones, tablet, smart TV, computers, etc), in view of their high number, are responsible of an important part of the energy globally consumed by video streaming applications. Even if video decoding is not the main part of the energy consumption of such devices (typically around 15% in a mobile phone, while display is closer to 50%), being able to reduce their energy impact is beneficial.

The green MPEG standard (ISO-IEC-23001-11), called green MPEG in the following, defines metadata, called green metadata in the following, to indicate to a decoder compliant with the standard AVC (ISO/CEI 14496-10/ITU-T H.264) or with the standard HEVC (ISO/IEC 23008-2-MPEG-H Part 2, High Efficiency Video Coding/ITU-T H.265)) complexity information related to a bitstream, that enables a decoder to optimize its energy usage. In the third edition of green MPEG under definition, a support for VVC (ISO/IEC 23090-3-MPEG-I, Versatile Video Coding/ITU-T H.266) is being defined. Green metadata specify parameters included in SEI messages and the syntax and semantic for a decoder operation power saving request.

The transport and signaling of green metadata in all versions of the green MPEG specification is limited to MPEG-DASH (Dynamic Adaptive Streaming over HTTP). However, green MPEG does not specify how the green metadata are transmitted in different transport environments such as UDP (User Datagram Protocol) based streaming. Indeed MPEG DASH does not specify a mapping to these transport formats.

Video standards generally define profiles. A profile defines a subset of the tools available in the video standard that may be used by a video encoder and that must be supported by a decoder. VVC proposed recently a more granular solution consisting in associating a constraint flag to most of the tools available in the VVC standard. A constraint flag allows signaling to a decoder whether the tool associated to this constraint flag was used or not to generate a bitstream. Profiles and/or constraint flags are two tools allowing therefore controlling a complexity of a decoder and, consequently, the energy consumed by this decoder.

However, the selection of a profile or of tools activated or deactivated by constraint flags is often an encoder decision. A pure encoder-based solution may not be enough when a decoder needs to rely on lower power consumption to continue to decode a stream (i.e, thus not interrupt the streaming service and keep an high QoE) e.g. when reaching the end of a battery charge, and needs to signal to the encoder its particular situation and desire for a different operating point.

Recommendation RFC-5104 (Codec Control Messages in the RTP Audio-Visual Profile with Feedback (AVPF)) defines a set of codec control messages (CCM), some of which being included in the HEVC RTP RFC and in the VVC RTP RFC. The codec control messages can be used by a receiver to indicate to a sender that a stream needs to be changed. The CCMs are used to perform SDP (Session Description Protocol: RFC-4566) capability negotiations as well as in session reporting. However, there is no CCM dedicated to energy consumption reduction.

It is desirable to propose solutions allowing to overcome the above issues. In particular, it is desirable to specify parameters for SDP/RTP (Real-time Transport Protocol) capability negotiations related to power consumption mode used for streaming. It is also desirable to specify CCMs that can be sent by a decoder during a session to request a change for a different energy consuming bitstream. These new parameters can be correlated to the Green Metadata specification and adapted to various context of use such as streaming applications based on MPEG-DASH, UDP based protocols or on the HLS (HTTP live streaming) protocol.

BRIEF SUMMARY

In a first aspect, one or more of the present embodiments provide a method comprising executing a streaming session establishment process allowing establishing a streaming session between two peers in a network, wherein the streaming session establishment process comprises receiving information allowing controlling a power consumption of a decoding process applied for decoding a stream representative of a content to be streamed in the streaming session.

In an embodiment, the information allowing controlling a power consumption of the decoding process is an information representative of a power consumption of at least one stream representative of the content.

In an embodiment, the information allowing controlling a power consumption of the decoding process is an information representative of at least one encoding tool that can be activated or deactivated to generate a stream representative of the content.

In an embodiment, the method comprises requesting a stream compliant with an expected power consumption or compliant with at least one specified activated or deactivated encoding tool based on the received information allowing controlling a power consumption.

In an embodiment, the information allowing controlling a power consumption of a decoding process is comprised in a session description protocol message or in a master playlist file or a media playlist file compliant with the HTTP live streaming protocol.

In an embodiment, the requesting of a stream compliant with an expected power consumption or compliant with at least one specified activated or deactivated encoding tool use a feedback message compliant with the Real Time Control Protocol.

In an embodiment, the feedback message comprises a field indicating a requested percentage of reduction of decoding operations in the decoding process relative to decoding operations since a last feedback message with the same field was sent, or since a start of the streaming session.

In an embodiment, the streaming session establishment process comprises a phase of capability negotiation wherein the peers negotiate a use of feedback messages.

In a second aspect, one or more of the present embodiments provide a method comprising: executing a streaming session establishment process allowing establishing a streaming session between two peers in a network, wherein the streaming session establishment process comprises transmitting information allowing controlling a power consumption of a decoding process applied for decoding a stream representative of a content to be streamed in the streaming session.

In an embodiment, the information allowing controlling a power consumption of the decoding process is an information representative of a power consumption of at least one stream representative of the content.

In an embodiment, the information allowing controlling a power consumption of the decoding process is an information representative of at least one encoding tool that can be activated or deactivated to generate a stream representative of the content.

In an embodiment, the method comprises receiving a request for a stream compliant with an expected power consumption or compliant with at least one specified activated or deactivated encoding tool and transmitting such stream.

In an embodiment, the information allowing controlling a power consumption of a decoding process is comprised in a session description protocol message or in a master playlist file or a media playlist file compliant with the HTTP live streaming protocol.

In an embodiment, the request for a stream compliant with an expected power consumption or compliant with at least one specified activated or deactivated encoding tool use a feedback message compliant with the Real Time Control Protocol.

In an embodiment, the feedback message comprises a field indicating a requested percentage of reduction of decoding operations in the decoding process relative to decoding operations since a last feedback message with the same field was sent, or since a start of the streaming session.

In an embodiment, the streaming session establishment process comprises a phase of capability negotiation wherein the peers negotiate a use of feedback messages.

In a third aspect, one or more of the present embodiments provide a device comprising: means for executing a streaming session establishment process allowing establishing a streaming session between two peers in a network, wherein the streaming session establishment process comprises receiving information allowing controlling a power consumption of a decoding process applied for decoding a stream representative of a content to be streamed in the streaming session.

In an embodiment, the information allowing controlling a power consumption of the decoding process is an information representative of a power consumption of at least one stream representative of the content.

In an embodiment, the information allowing controlling a power consumption of the decoding process is an information representative of at least one encoding tool that can be activated or deactivated to generate a stream representative of the content.

In an embodiment, the device comprises means for requesting a stream compliant with an expected power consumption or compliant with at least one specified activated or deactivated encoding tool based on the received information allowing controlling a power consumption.

In an embodiment, the information allowing controlling a power consumption of a decoding process is comprised in a session description protocol message or in a master playlist file or a media playlist file compliant with the HTTP live streaming protocol.

In an embodiment, the means for the requesting a stream compliant with an expected power consumption or compliant with at least one specified activated or deactivated encoding tool use a feedback message compliant with the Real Time Control Protocol.

In an embodiment, the feedback message comprises a field indicating a requested percentage of reduction of decoding operations in the decoding process relative to decoding operations since a last feedback message with the same field was sent, or since a start of the streaming session.

In an embodiment, the means for executing a streaming session establishment process comprises means for executing a phase of capability negotiation wherein the peers negotiate a use of feedback messages.

In a fourth aspect, one or more of the present embodiments provide a device comprising: means for executing a streaming session establishment process allowing establishing a streaming session between two peers in a network, wherein the streaming session establishment process comprises transmitting information allowing controlling a power consumption of a decoding process applied for decoding a stream representative of a content to be streamed in the streaming session.

In an embodiment, the information allowing controlling a power consumption of the decoding process is an information representative of a power consumption of at least one stream representative of the content.

In an embodiment, the information allowing controlling a power consumption of the decoding process is an information representative of at least one encoding tool that can be activated or deactivated to generate a stream representative of the content.

In an embodiment, the device comprises means for receiving a request for a stream compliant with an expected power consumption or compliant with at least one specified activated or deactivated encoding tool and transmitting such stream.

In an embodiment, the information allowing controlling a power consumption of a decoding process is comprised in a session description protocol message or in a master playlist file or a media playlist file compliant with the HTTP live streaming protocol.

In an embodiment, the request for a stream compliant with an expected power consumption or compliant with at least one specified activated or deactivated encoding tool use a feedback message compliant with the Real Time Control Protocol.

In an embodiment, the feedback message comprises a field indicating a requested percentage of reduction of decoding operations in the decoding process relative to decoding operations since a last feedback message with the same field was sent, or since a start of the streaming session.

In an embodiment, the streaming session establishment process comprises a phase of capability negotiation wherein the peers negotiate a use of feedback messages.

In a fifth aspect, one or more of the present embodiments provide a signal comprising information allowing controlling a power consumption of a decoding process applied for decoding a stream representative of a content to be streamed in a streaming session between two peers and adapted to be exchanged between the peers during a streaming session establishment process.

In a sixth aspect, one or more of the present embodiments provide a computer program comprising program code instructions for implementing the method according to the first and the second aspect.

In a seventh aspect, one or more of the present embodiments provide a non-transitory information storage medium storing program code instructions for implementing the method according to the first and the second aspect.

BRIEF DESCRIPTION OF THE DRAWINGS

FIG. 7 provides a common packet format used for all RTCP feedback messages; and, FIG. 8 illustrates schematically the content of a FCI (Feedback Control Information) field for DORN (Decoder operations reduction Notification) message.

DETAILED DESCRIPTION

The various embodiments described in the following use MPEGx or H26x video compression standards such as the standard VVC. However, these various embodiments are not limited to these standards and could apply to other video compression formats such as AV1 developed by the Alliance for Open Media (AOM), VP9, AVS2 and AVS3 defined by AVS (Audio Video Standard) and their successors. In addition, while only video streaming applications are considered, these embodiments can also apply to audio streaming applications and cloud gaming applications.

Figure 1:
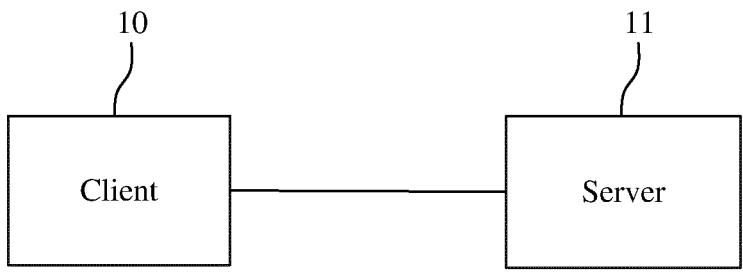
FIG. 1 describes an example of a first streaming context in which embodiments can be implemented.

FIG. 1 describes an example of a first streaming context in which embodiments can be implemented.

In this first example, a client 10 communicates with a server 11 via a network. The network could be a wireless network such as a 4G/5G/WiFi or a wired network such as the internet and can comprises a plurality of network devices such as routers and CDN (content delivery network). The server 11 is for instance an on-demand streaming server streaming video data. The client 10 is for example a smartphone, a tablet, a PC, a set top box or a smart TV. A video streaming application is running between the server 11 and the client 10. This video streaming application is for example based on the RTP (Real-time Transport Protocol), RTSP (Real Time Streaming Protocol) and SDP protocols. For various reasons, the client 10 needs to adjust the decoding complexity of the stream it decodes in order to control its energy consumption. For instance, the client 10 is configured by a user to extend as much as possible the lifetime of its battery.

Figure 2:
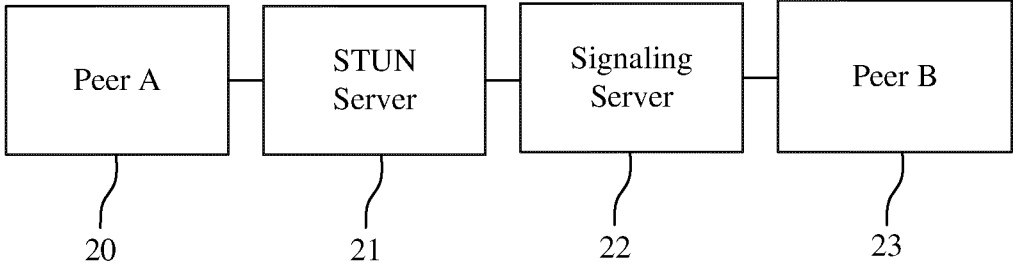
FIG. 2 describes an example of a second streaming context in which embodiments can be implemented.

FIG. 2 describes an example of a second streaming context in which embodiments can be implemented.

The example illustrated in FIG. 2 is based on WebRTC. WebRTC (Web Real-Time Communication) is defined in IETF as a suite of RFCs and in W3C and provides web browsers and applications with real-time communication via simple application programming interfaces (APIs). It allows audio and video communication to work inside web pages by allowing direct peer-to-peer communication, eliminating a need to install plugins or download apps. However, WebRTC protocols can also be implemented and used by native applications or downloaded applications.

In FIG. 2, a first peer 20 (peer A) is communicating with a second peer 23 (peer B) via a STUN server 21 and a signaling server 22. A STUN server (Simple Traversal of UDP through Network Address Translators (NATs) allows UDP peers located in a local area network (LAN) behind a firewall to discover its public address as well as a type of NAT behind which it is located. This information is used to exchange correctly UDP data with devices outside the LAN. The signaling server 22 (or WebRTC signaling server) is a server that manages the connections between devices. It doesn't deal with the media traffic itself, but rather takes care of signaling. This includes enabling one user to find another in the network, negotiating the connection itself, resetting the connection if needed, and closing it down. As the client 10 in FIG. 1, the first peer 20 is for instance a smartphone, a tablet, a PC, a set top box or a smart TV. The second peer 23 is for example also an on-demand video streaming server as the server 11.

Figure 3A:
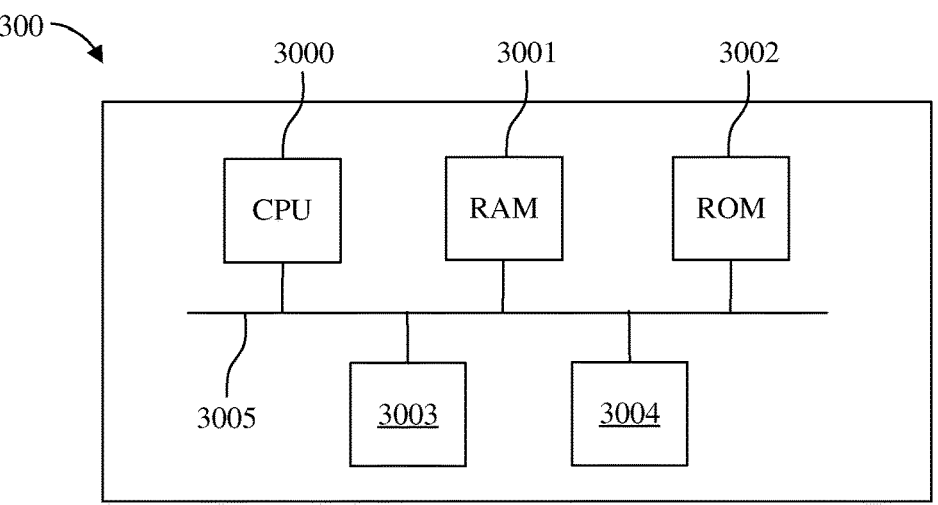
FIG. 3A illustrates schematically an example of hardware architecture of a processing module in which various aspects and embodiments are implemented.

FIG. 3A illustrates schematically an example of hardware architecture of a processing module 300 able to implement modules of the client 10 such as a decoding module or a communication module or modules of the server 11 such as an encoding module or a communication module. The processing module 300 is also able to implement modules of the first peer 20 such as a decoding module or a communication module or modules of the second peer 23 such as an encoding module or a communication module.

The processing module 300 comprises, connected by a communication bus 3005: a processor or CPU (central processing unit) 3000 encompassing one or more microprocessors, general purpose computers, special purpose computers, and processors based on a multi-core architecture, as non-limiting examples; a random access memory (RAM) 3001; a read only memory (ROM) 3002; a storage unit 3003, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 3004 for exchanging data with other modules, devices or equipment. The communication interface 3004 can include, but is not limited to, a transceiver configured to transmit and to receive data over a communication channel 3 (not represented in FIG. 3A). The communication interface 3004 can include, but is not limited to, a modem or network card.

The processor 3000 is capable of executing instructions loaded into the RAM 3001 from the ROM 3002, from an external memory (not shown), from a storage medium, or from a communication network. When the processing module 300 is powered up, the processor 3000 is capable of reading instructions from the RAM 3001 and executing them. These instructions form a computer program causing, for example, the implementation by the processor 3000 of a decoding method, an encoding method, and processes executed for streaming data described below in this document.

All or some of the algorithms and steps described below may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 3B:
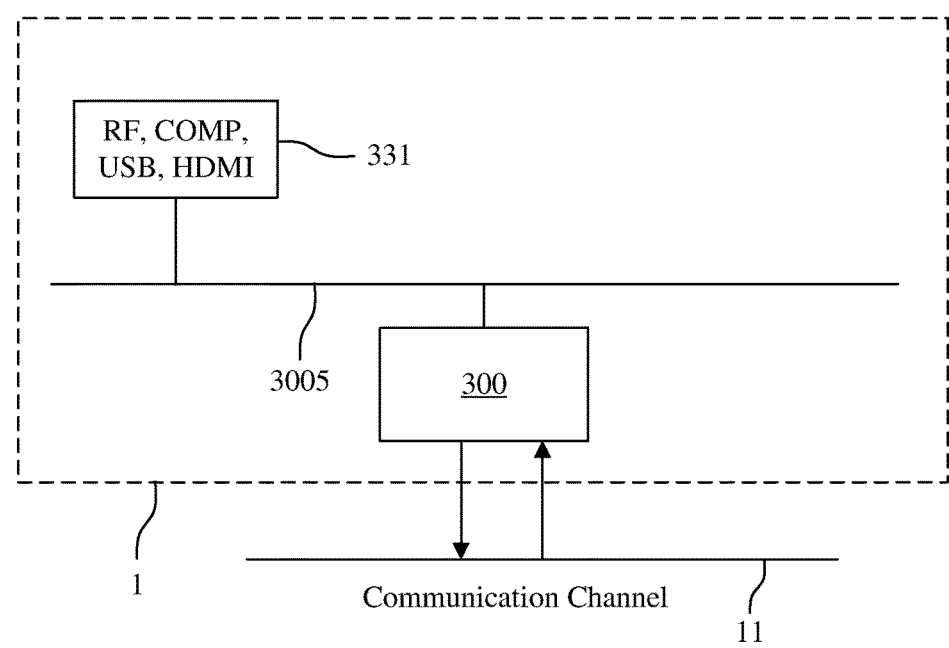
FIG. 3B illustrates a block diagram of an example of a game system in which various aspects and embodiments are implemented.
Figure 3C:
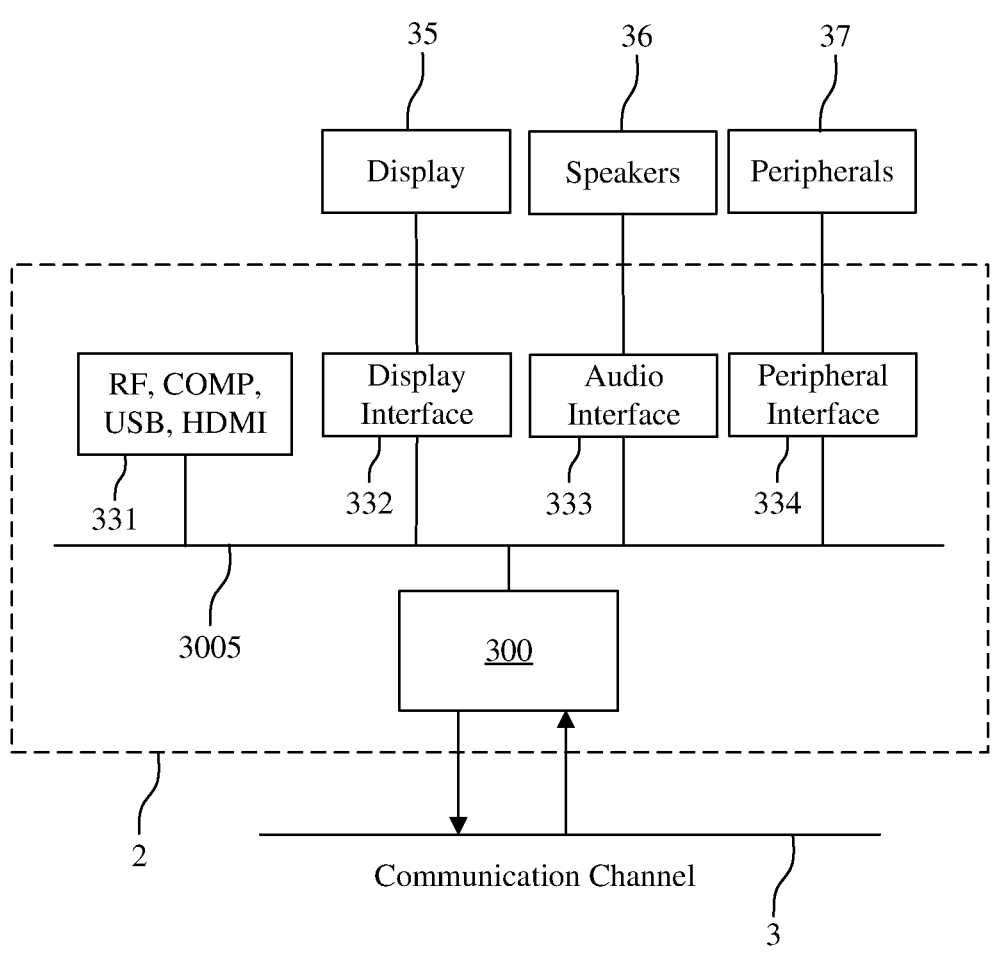
FIG. 3C illustrates a block diagram of an example of a server in which various aspects and embodiments are implemented.

FIG. 3C illustrates a block diagram of an example of the system 2, that could be a client 10 or the first peer 20, in which various aspects and embodiments are implemented. The system 2 is configured to perform one or more of the aspects and embodiments described in this document. As already mentioned above, examples of such devices include, but are not limited to, various electronic devices such as personal computers (PC), laptop computers, smartphones, tablet computers, head mounted display and a game console. Elements of system 2, singly or in combination, can be embodied in a single integrated circuit (IC), multiple ICs, and/or discrete components. For example, in at least one embodiment, the system 2 comprises one processing module 500 that implements a video decoder and a streaming module. In various embodiments, the system 2 is communicatively coupled to one or more other systems, or other electronic devices, via, for example, a communications bus or through dedicated input and/or output ports. In various embodiments, the system 2 is configured to implement one or more of the aspects described in this document.

The input to the processing module 300 can be provided through various input modules as indicated in block 331. Such input modules include, but are not limited to, (i) a radio frequency (RF) module that receives an RF signal transmitted, for example, over the air.

In various embodiments, the input modules of block 331 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, bandlimiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Various elements of system 2 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 2, the processing module 300 is interconnected to other elements of said system 2 by the bus 3005.

The communication interface 3004 of the processing module 300 allows the system 2 to communicate on the communication channel 3. As already mentioned above, the communication channel 3 can be implemented, for example, within a wired and/or a wireless medium.

Data is streamed, or otherwise provided, to the system 2, in various embodiments, using a wireless network such as a Wi-Fi network, for example IEEE 802.11 (IEEE refers to the Institute of Electrical and Electronics Engineers). The Wi-Fi signal of these embodiments is received over the communications channel 3 and the communications interface 3004 which are adapted for Wi-Fi communications. The communications channel 3 of these embodiments is typically connected to an access point or router that provides access to external networks including the Internet for allowing streaming applications and other over-the-top communications. Other embodiments provide streamed data to the system 2 using the RF connection of the input block 331. Additionally, various embodiments use wireless networks other than Wi-Fi, for example a cellular network.

The system 2 can provide an output signal to various output devices, including a display system 35, speakers 36, and other peripheral devices 37. The display system 35 of various embodiments includes one or more of, for example, a touchscreen display, an organic light-emitting diode (OLED) display, a curved display, and/or a foldable display. The display system 35 can be for a television, a tablet, a laptop, a smartphone, a head mounted display or other devices. The display system 35 can also be integrated with other components, for example, as in a smartphone, or separate, for example, an external monitor for a laptop. The other peripheral devices 37 include, in various examples of embodiments, one or more of a stand-alone digital video disc (or digital versatile disc) (DVR, for both terms), a disk player, a stereo system, and/or a lighting system. Various embodiments use one or more peripheral devices 37 that provide a function based on the output of the system 2. For example, a disk player performs the function of playing an output of the system 2.

In various embodiments, control signals are communicated between the system 2 and the display system 35, speakers 36, or other peripheral devices 37 using signaling such as AV.Link, Consumer Electronics Control (CEC), or other communications protocols that enable device-to-device control with or without user intervention. The output devices can be communicatively coupled to system 2 via dedicated connections through respective interfaces 332, 333, and 334. Alternatively, the output devices can be connected to system 2 using the communications channel 3 via the communications interface 3004 or a dedicated communication channel via the communication interface 3004. The display system 35 and speakers 36 can be integrated in a single unit with the other components of system 2 in an electronic device. In various embodiments, the display interface 332 includes a display driver, such as, for example, a timing controller (T Con) chip.

The display system 35 and speaker 36 can alternatively be separate from one or more of the other components. In various embodiments in which the display system 35 and speakers 36 are external components, the output signal can be provided via dedicated output connections, including, for example, HDMI ports, USB ports, or COMP outputs.

FIG. 3B illustrates a block diagram of an example of the system 1, that could be the server 11 or the second peer 23, in which various aspects and embodiments are implemented. System 1 is very similar to the system 2. The system 1 is configured to perform one or more of the aspects and embodiments described in this document. Examples of such system 1 include, but are not limited to, various electronic devices such as personal computers, laptop computers and a server. Elements of system 1, singly or in combination, can be embodied in a single integrated circuit (IC), multiple ICs, and/or discrete components. For example, in at least one embodiment, the system 1 comprises one processing module 300 that implements a video encoder and/or a streaming module. In various embodiments, the system 1 is communicatively coupled to one or more other systems, or other electronic devices, via, for example, a communications bus or through dedicated input and/or output ports. In various embodiments, the system 1 is configured to implement one or more of the aspects described in this document.

The input to the processing module 300 can be provided through various input modules as indicated in block 331 already described in relation to FIG. 3C.

Various elements of system 1 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 1, the processing module 300 is interconnected to other elements of said system 1 by the bus 3005.

The communication interface 3004 of the processing module 300 allows the system 1 to communicate on the communication channel 3.

Data is streamed, or otherwise provided, to the system 1, in various embodiments, using a wireless network such as a Wi-Fi network, for example IEEE 802.11 (IEEE refers to the Institute of Electrical and Electronics Engineers). The Wi-Fi signal of these embodiments is received over the communications channel 3 and the communications interface 3004 which are adapted for Wi-Fi communications. The communications channel 3 of these embodiments is typically connected to an access point or router that provides access to external networks including the Internet for allowing streaming applications and other over-the-top communications. Other embodiments provide data to the system 1 using the RF connection of the input block 331.

Various embodiments use wireless networks other than Wi-Fi, for example a cellular network.

The data provided to the system 1 are for instance, data allowing controlling the streamed video.

In an embodiment, the system 1 provides (i.e. stream) an encoded video bitstream in the form of an output signal to the system 2.

Various implementations involve decoding. "Decoding", as used in this application, comprises applying a decoding process to an encoded video stream in function of encoding tools that are activated or deactivated in the encoded video stream but also, in some embodiments, in function of tuning parameter defining a particular implementation of the decoding process.

Various implementations involve encoding. "Encoding" as used in this application comprises applying an encoding process in function of activated encoding tools, but also, in some embodiments, in function of tuning parameter defining a particular implementation of the encoding process.

Note that the parameters names as used herein, are descriptive terms. As such, they do not preclude the use of other parameters names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a use of some coding tools. In this way, in an embodiment the same parameters can be used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream comprising constraints flags in a data structure general_constraints_info. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

RTP Signaling and Mapping to SDP Fields:

When RTP is used to send media (as in the example of FIG. 1) between a server and a client, it can be advantageous to exchange information related to a control of the power consumption at the client side (i.e. the power consumption of a decoding process) and to make some recurring requests to the sender over time. Information representative of decoding complexities of streams that can be obtained by a client can be signaled as an extension of a SDP mechanism such as the one defined in RTP/AVPF (RFC4585).

A VVC RTP payload, currently under definition in document RTP Payload Format for Versatile Video Coding (VVC), draft-ietf-avtcore-rtp-vvc-02, defines in section 7.1 a media type registration as follow:

```
Type name: video
Subtype name: H266
Required parameters: none
Optional parameters: profile-id, tier-flag, sub-profile-id,
interop-constraints, and level-id
```

In a first embodiment, it is proposed to introduce an additional optional power consumption parameter, power-cons, in the media type registration as follows:

```
Type name: video
Subtype name: H266
Required parameters: none
Optional parameters: profile-id, tier-flag, sub-profile-id, interop-constraints,
level-id and power-cons
```

The new optional parameter power-cons is an information allowing controlling a power consumption of a decoding process.

In an embodiment, the new optional power consumption parameter power-cons informs a client that the server supports parameters related to a control of power consumption.

In a variant, the new optional power consumption parameter, power-cons, signals to a client which parameters allowing controlling a power consumption are supported by the server and is defined as follows:

```
A base64 [RFC4648] representation of data that comprises at least one of the syntax elements
dec_ops_reduction_ratio_from_max(i), dec_ops_reduction_ratio_from_prev(i) and
ms_num_quality_levels, ms_rgb_component_for_infinite psnr, that apply to a bitstream.
```

The syntax elements dec_ops_reduction_ratio_from_max (i), dec_ops_reduction_ratio_from_prev(i), ms_num_quality_levels, and ms_rgb_component_for_infinite_psnr are defined in the green MPEG standard. dec_ops_reduction- _ratio_from_max(i) indicates a percentage by which decoding operations are reduced for a $i^{th}$ representation of a current video segment compared to the most demanding representation of the current video Segment. dec_ops_reduction_ratio_from_prev(i) indicates a percentage by which decoding operations are reduced for the current video segment compared to the previous video segment for the $i^{th}$ representation in a given period. A negative value means an increase in decoding operations. The syntax elements dec_ops_reduction_ratio_from_max(i), dec_ops_reduction_ratio_from_prev(i) provides information representative of the decoding complexity of a plurality of versions of a same video content. ms_num_quality_levels indicates the number of quality levels that are enabled by the metadata. ms_rgb_component_for_infinite_psnr indicates the average, over the N reconstructed frames of the video Segment, of the largest RGB component (as defined in section 3.1 of green MPEG) in each of the reconstructed frames.

In another variant, the power consumption parameter power-cons again signals to a client which parameters allowing controlling a power consumption are supported by the server and is defined as follows:

---

A base64 [RFC4648] representation of data that comprises at least one of the syntax elements disable_loop_filters, disable_bi_prediction, disable_intra_in_B, disable_fracpel_filtering, disable_user_defined_tool_0, disable_user_defined_tool_1

---

The syntax elements disable_loop_filters, disable_bi_prediction, disable_intra_in_B, disable_fracpel_filtering respectively indicate that loop-filters, bi-predictions, intra prediction in P or B slices, fractional pel filtering in P or B slices can be enabled or disabled as they have a non-negligeable impact on power consumption. Each syntax element disable_user_defined_tool_X, is a user-defined syntax element, allowing a server to indicate the support for a client to request that at least one user defined tool in a video codec is turned off. In VVC, this can be achieved by selecting different constraint flags. While two user defined syntax elements disable_user_defined_tool_X are described here, other numbers of user defined syntax elements disable_user_defined_tool_X can be defined.

The power-cons parameters can be used as part of the RTP payload type for the VVC SDP as follows:

---

```
m=video 49170 RTP/AVP 98
a=rtpmap:98 H266/90000
a=fmtp:98 profile-id=1;
     sprop-vps=<video parameter sets data>;
     sprop-sps=<sequence parameter set data>;
     sprop-pps=<picture parameter set data>;
a=fmtp:98 power-cons
```

---

Figure 4:
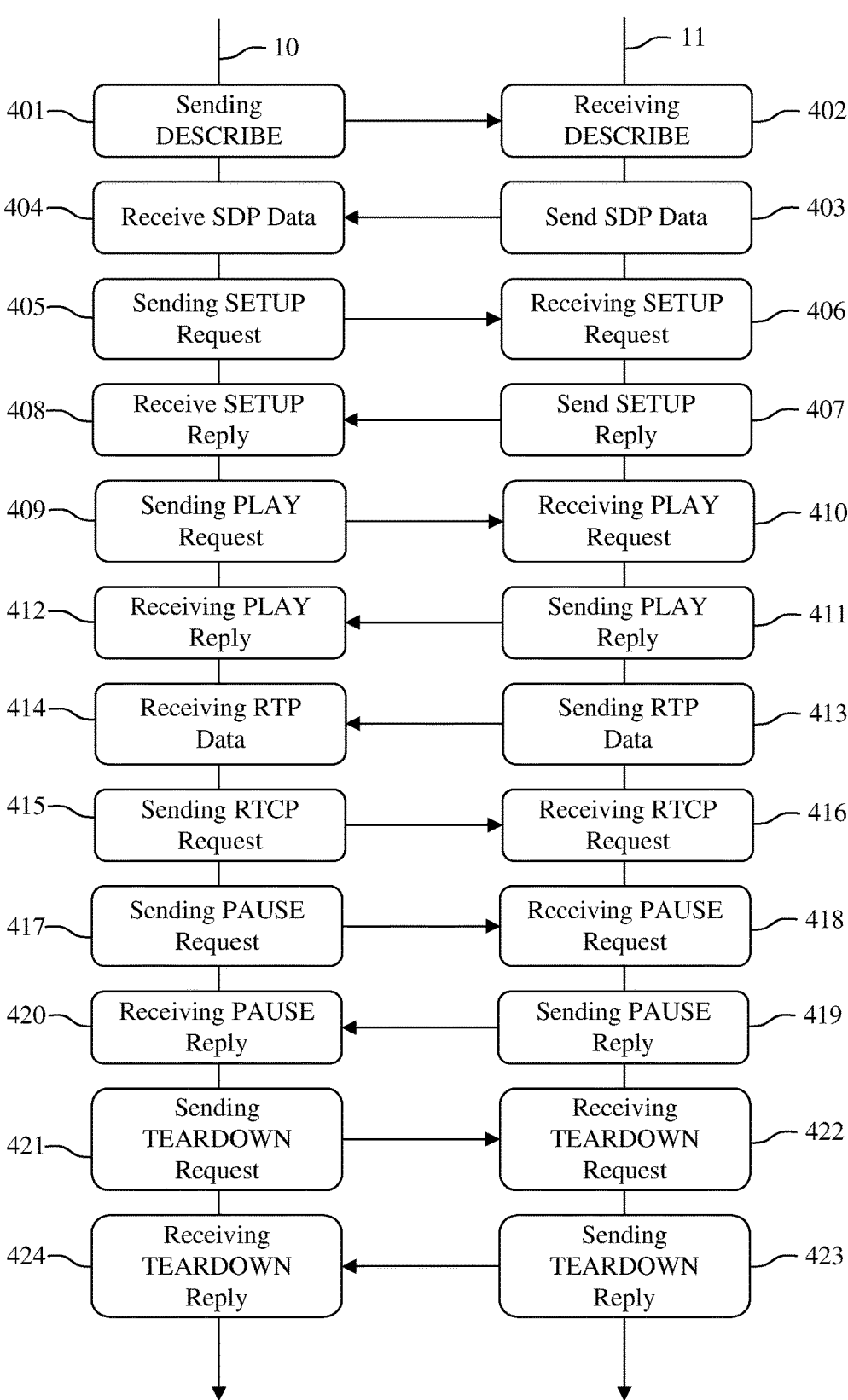
FIG. 4 illustrates a connection establishment process between a client and a server using a RTSP session-based streaming according to an embodiment.

FIG. 4 illustrates a streaming session establishment process between a client and a server using a RTP/RTSP session-based streaming according to the first embodiment.

In a step 401, the processing module 300 of the client 10 sends a RTSP DESCRIBE request to the server 11. The RTSP DESCRIBE request allows retrieving a description of a content or media object identified by a request URL from a server. It may use an Accept header to specify description formats that the client understands.

In a step 402, the processing module 300 of the server 11 receives the RTSP DESCRIBE request.

In a step 403, the processing module 300 of the server 11 responds with a SDP message comprising a description of the requested content in SDP format. The new optional power consumption parameter power-cons is included in the SDP message to signal at least a support of parameters related to a control of power consumption but also power-consumption information related to the requested content.

In a step 404, the processing module 300 of the client 10 receives the SDP message comprising the parameter power-cons. In an embodiment, the parameter power-cons just informs the client 10 that the server 11 supports parameters related to power consumption. In another embodiment the parameter power-cons comprises for example the syntax element dec_ops_reduction_ratio_from_max(i) and/or the syntax elements disable_loop_filters, disable_bi_prediction, disable_intra_in_B, disable_fracpel_filtering, disable_user_defined_tool_0, disable_user_defined_tool_1. Therefore, in step 404, the processing module 300 of the client 10 receives information allowing controlling a power consumption of its decoding process.

In a step 405, the processing module 300 of the client 10 sends a RTSP SETUP request to the server 11. A RTSP SETUP request specifies the transport mechanism to be used for a streamed content. In addition, this RTSP SETUP request specifies the level of power consumption (or a level of power consumption reduction with respect to the most complex version of a content) expected by the client 10 for decoding a stream corresponding to the requested content or characteristics it expects, in terms of activated or inactivated encoding tools, for the stream corresponding to the requested content. For instance, the client 10 requests 50% reduction with respect to the most complex version of the requested content or request a deactivation version of the content wherein loop filters are deactivated. As can be seen, in step 405, the client 10 can request a stream compliant with an expected power consumption or compliant with specified activated or deactivated encoding tools.

In a variant, in step 405, the client 10 can request an expected power consumption and specify activated and deactivated encoding tools. For instance, the client 10 requests 50% reduction with respect to the most complex version of the requested content and request a deactivation version of the content wherein loop filters are deactivated.

One can note that, when the parameter power-cons indicates only to the client 10 that the server supports parameters related to a control of power consumption (without specifying which parameters related to a control of power consumption is supported), the client 10 understand that any parameter is supported for example any parameter in a set comprising dec_ops_reduction_ratio_from_max(i), dec_ops_reduction_ratio_from_prev(i), ms_num_quality_levels, ms_rgb_component_for_infinite_psnr, disable_loop_filters, disable_bi_prediction, disable_intra_in_B, disable_fracpel_filtering, disable_user_defined_tool_0, disable_user_defined_tool_1.

In a step 406, the processing module 300 of the server 11 receives the RTSP SETUP request.

In a step 407, the processing module 300 of the server 11 sends a RTSP SETUP reply comprising transport parameters and a session identifier selected by the processing module of the server 11.

In a step 408, the processing module 300 of the client 10 receives the RTSP SETUP reply.

In a step 409, the processing module 300 of the client 10 sends a RTSP PLAY request. A RTSP PLAY request tells the server 11 to start sending data corresponding to a version of the requested content via the mechanism specified in the RTSP SETUP request.

In a step 410, the processing module 300 of the server 11 receives the RTSP PLAY request.

In a step 411, the processing module 300 of the server 11 sends a RTSP PLAY reply confirming the start of the sending of the data.

In a step 412, the processing module 300 of the client 10 receives the RTSP PLAY reply confirming the start of the sending of the data.

In step 413, the sending of the data by the processing module 300 of the server 11 starts using a RTP session. The sent data corresponds to a version of the content corresponding to the energy consumption or the characteristics in terms of activated and deactivated encoding tools expected by the client and specified by in the RTSP SETUP request sent in step 405.

In a step 414, the client 11 starts receiving the data.

In a step 415, during the transmission of the data, the processing module 300 of the client 10 sends regularly RTCP (Real-Time Control Protocol) requests to provide to the server 11 information on the ongoing RTP session. Reception of RTCP requests by the server 11 is represented by a step 416.

In a step 417, the processing module 300 of the client 10 sends a RTSP PAUSE request to the server 11. A RTSP PAUSE request causes the stream delivery to be interrupted temporarily.

In a step 418, the processing module 300 of the server 11 receives the RTSP PAUSE request.

In a step 419, the processing module 300 of the server 11 sends a RTSP PAUSE reply confirming the pause to the client 10.

In a step 420, the processing module 300 of the client 12 receives the RTSP PAUSE reply.

In a step 421, the processing module 300 of the client 10 sends a RTSP TEARDOWN request to the server 11. A RTSP TEARDOWN request stops the stream delivery, freeing the resources associated with it.

In a step 422, the processing module 300 of the server 11 receives the RTSP TEARDOWN request.

In a step 423, the processing module 300 of the server 11 sends a RTSP TEARDOWN reply confirming the stop to the client 10.

In a step 424, the processing module 300 of the client 12 receives the RTSP TEARDOWN reply.

One can note that, during an ongoing streaming session, each time the client 10 wants to modify the energy consumed to decode the requested content, it can loop back to step 405 and send a new RTSP SETUP request to the server 11 comprising new energy consumption requirements.

Figure 5:
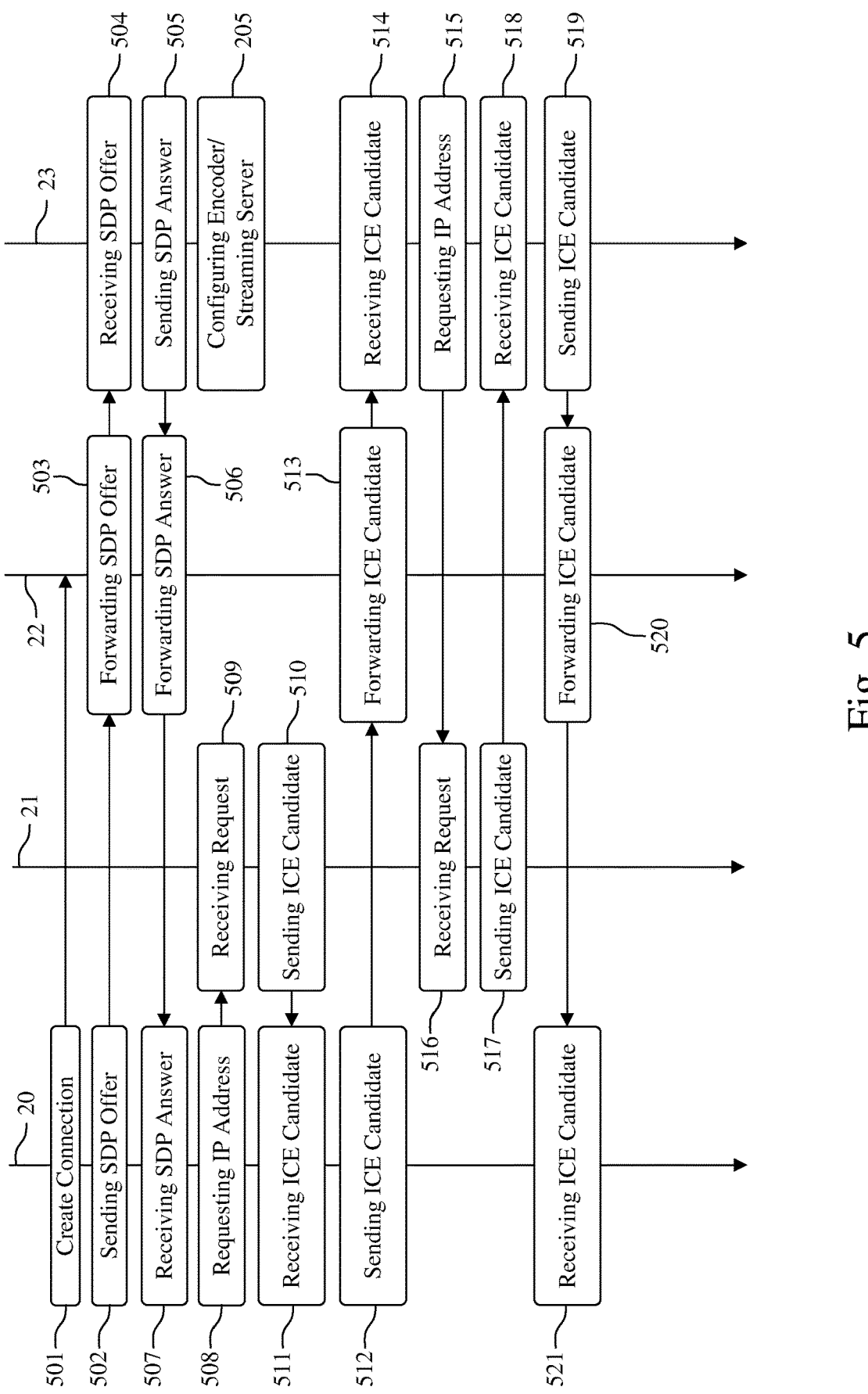
FIG. 5 illustrates a connection establishment process between two peer devices using WebRTC session-based media streaming.

FIG. 5 illustrates a streaming session establishment process between two peer devices using WebRTC session-based media streaming according to the first embodiment.

In a step 501, the processing module 300 of the first peer 20 requests a creation of a connection to the signaling server 22.

In a step 502, the processing module 300 of the first peer 20 sends a SDP offer to the second peer 23. The SDP offer contains information on the content or media the first peer 20 wants to share with the second peer 23.

In a step 503, the signaling server 22 receives the SDP offer and forwards this SDP offer to the second peer 23.

In a step 504, the processing module 300 of the second peer 23 receives the SDP offer.

In a step 505, the processing module 300 of the second peer 23 sends a SDP answer to the second peer 23. The SDP answer contains information on the media the second peer 23 wants to share with the first peer 20.

In a step 506, the signaling server 22 receives the SDP answer and forwards this SDP answer to the first peer 20.

In a step 507, the processing module 300 of the first peer 20 receives the SDP answer.

In the version of the first embodiment illustrated in FIG. 5, the SDP offer and SDP answer comprise the new optional power consumption parameter power-cons to signal at least a support of energy consumption parameters. In step 504 (respectively in step 507), the processing module 300 of the second peer 23 (respectively of the first peer 20) receives information allowing controlling a power consumption of its decoding process.

Step 507 is followed by a phase of negotiation (steps 508 to 521) between the first peer 20 and second peer 23 to determine an ICE (Interactive Connectivity Establishment) candidate. An ICE candidate describes the protocols and routing needed for WebRTC to be able to communicate with a remote device. When starting a WebRTC peer connection, typically a number of ICE candidates are proposed by each peer of the connection, until they mutually agree upon one which describes the connection they decide will be best. WebRTC then uses that candidate's details to initiate the connection.

This negotiation starts in the step 508 when the processing module 300 of the first peer 20 requests an IP (Internet Protocol) address to the STUN server 21.

In a step 509, the STUN server 21 receives this request and transmits in reply an ICE candidate to the first peer 20 in a step 510.

In a step 511, the processing module 300 of the first peer 20 receives the ICE candidate and forwards this ICE candidate to the signaling server 22 in a step 512.

In a step 513, the signaling server 22 receives the ICE candidate and forward this ICE candidate to the second peer 23.

In a step 514, the processing module 300 of second peer 23 receives the ICE candidate.

In the step 515, the processing module 300 of the second peer 23 requests an IP address to the STUN server 21.

In a step 516, the STUN server 21 receives this request and transmits in reply an ICE candidate to the second peer 23 in a step 517.

In a step 518, the processing module 300 of the second peer 23 receives the ICE candidate and forwards this ICE candidate to the signaling server 22 in a step 519.

In a step 520, the signaling server 22 receives the ICE candidate and forward this ICE candidate to the first peer 20.

In a step 521, the processing module 300 of first peer 20 receives the ICE candidate.

Steps 508 to 521 are repeated until the first peer 20 and the second peer 23 agree on an ICE candidate.

In a first variant of the first embodiment, a sprop constraint field sprop-pwc=<power-consumption parameter set data> is defined for example in the VVC RTP payload and includes at least the parameters dec_ops_reduction_ratio_from_max, dec_ops_reduction_ratio_from_prev and ms_num_quality_levels, ms_rgb_component_for_infinite_psnr defined in green MPEG.

A mapping of the new sprop constraint field sprop-pwc to SDP is for example as follows:

```
m=video 49170 RTP/AVP 98
a=rtpmap:98 H266/90000
a=fmtp:98 profile-id=1;
sprop-vps=<video parameter sets data>;
sprop-sps=<sequence parameter set data>;
sprop-pps=<picture parameter set data>;
```

In a second variant of the first embodiment, the new sprop constrain field sprop-pwc=<power-consumption parameter set data> includes the parameters disable_loop_filters, disable_bi_prediction, disable_intra_in_B, disable_fracpel_filtering, disable_user_defined_tool_0, disable_user_defined_tool_1.

In a third variant of the first embodiment, while the new sprop constraint field sprop-pwc described above contains some parameters defined in green MPEG, the new sprop constraint field sprop-pwc could instead include some more generic level of power consumption such as "HL" "QL" "Default" "QM" and "HM". HL and QL represent respectively Half and Quarter Less than the default power consumption for a given stream. QM and HM represent respectively Half and Quarter More power consumption than HL and QL.

In a fourth variant of the first embodiment, a signed value is indicated as a decrease/increase in percentage of power consumption. That percentage can be derived as described in green MPEG.

In a fifth variant of the first embodiment, SDP attributes ACAP (Attribute CAPability) and SDP attributes PCFG (Potential ConFiGuration) as defined in RFC 5939: Session Description Protocol (SDP) Capability Negotiation can be included in an offer/answer to indicate that additional configurations are supported. For instance: the following ACAP PWC (Power Consumption) attribute capability corresponding to a support of various decoder power consumption and potential configurations (pcfg) are present in an offer:

```
m=video 49170 RTP/AVP 98
a=rtpmap:98 H266/90000
a=tcap:1 RTP/SAVPF
a= acap:1
a=acap:2 PWC: mode 0
a=acap:3 PWC: mode 1
a=acap :4 PWC : mode 2
a=pcfg:1 t: 1 a 2|3
a=pcfg:8 a:1
```

In this example, the offer proposes RTP/AVP (RFC 3551: RTP Profile for Audio and Video Conferences with Minimal Control) on the m line and one transport option tcap with secure RTP/SAVP (Real-time Transport Protocol/Secure Audio Video Profile). The offer proposes potential power (PWC) attribute capabilities (acap: 2, 3 and 4) with PWC setting respectively equal to mode "0", mode "1" or mode "2". The mode "0" corresponds to the power consumption calculation based on a parameter dec_ops_reduction_req described below and/or on the parameters used to describe power-cons and sprop-pwc above (i.e. dec_ops_reduction_ratio_from_max, dec_ops_reduction_ratio_from_prev, ms_num_quality_levels and ms_rgb_component_for_infinite_psnr). The mode "1" corresponds to power consumption mode based on the use of flags allowing to enable or disable coding tools as described above. The mode "2" corresponds to a power consumption mode based on spatial or/and temporal scaling factor which can be offered and requested during a session. The preferred potential configuration is indicated by pcfg: 1 with the secured transport (t: 1) and the PWC (a: 2|3) which means that both mode "0" and mode "1" of PWC is offered. The least favored potential configuration is indicated by pcfg: 8 with no PWC support indicated.

A decoder choosing the second configuration (acap: 2) in the response will then have the ability to send some requests for streams corresponding to various estimated power consumption in accordance with mode "0" or mode "1".

Codec Control Messages (CCM) and Capability Negotiation:

In the context of green MPEG it can be advantageous to support a CCM related to control of the power consumption at the receiver side (i.e. of a decoding process) and to make some recurring requests to the sender over time. These CCM information can be provided as part of the RTCP messages illustrated in FIG. 4 and further detailed in the following in the WebRTC context in relation to FIG. 6.

Figure 7:
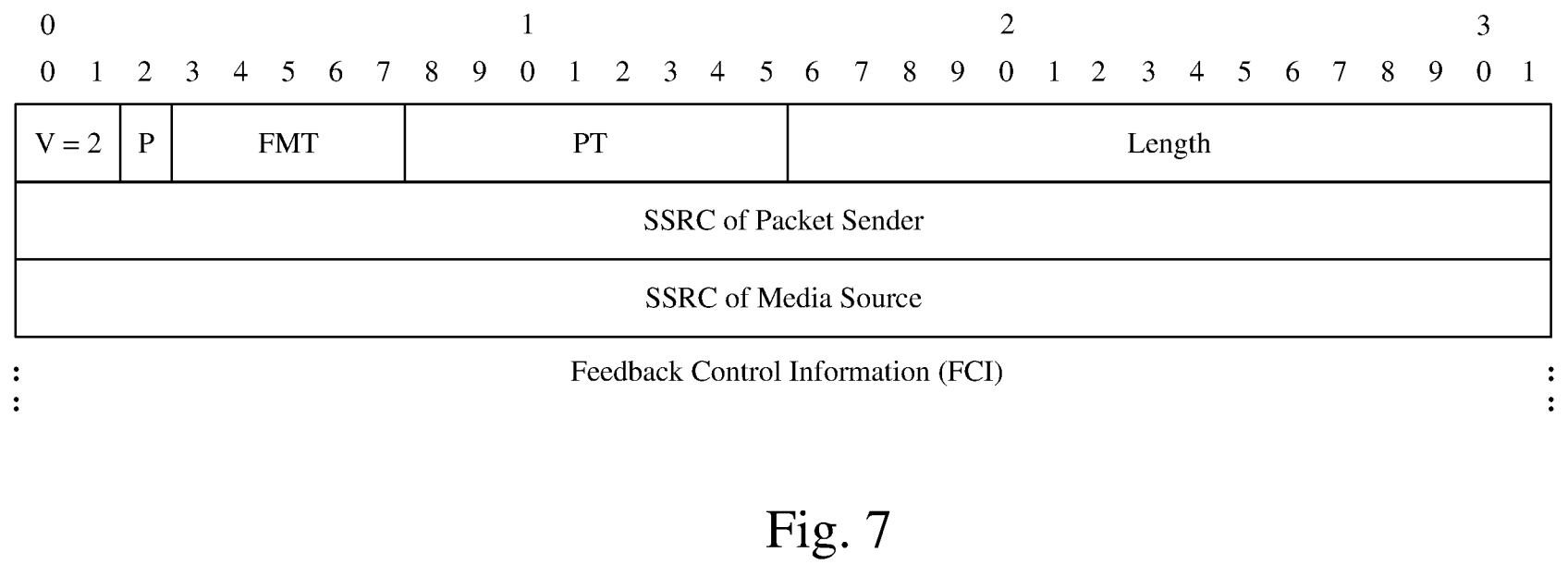

RTCP offers extension mechanisms to support new CCM. In Particular, section 4.2 of RFC-4585 (RTP/AVPF) describes a RTCP feedback capability attribute "a=rtcp-fb" that can be used to signal specific receiver requests. Section 6.1 of RFC-4585 defines a common packet format for feedback messages. This packet format, illustrated in FIG. 7, defines a field payload type (PT). This field PT allows identifying a RTCP packet as being a RTCP feedback message. This field can take two values. The value "206" allows identifying a Payload-Specific feedback (PSFB) message.

In an embodiment, the payload-specific feedback (PSFB) message is extended to allow a support of a CCM allowing controlling the power consumption of a decoder with RTCP. To do so, the field FMT of the payload-specific feedback (PSFB) message is given a specific value (for instance 16) to reserve that value for a new DORR (Decoder Operation Reduction Request) payload-specific feedback message. In other words, the payload-specific feedback (PFSB) message can be viewed as a generic feedback message that can be specified using the field FMT. The purpose of the DORR message is to force an encoder to send a version of a bitstream that require a different power consumption at the receiving end as soon as possible. Upon reception of a DORR message, a sender must start sending a version of a media corresponding to the parameters specified in the DORR message.

In an embodiment, a FCI (Feedback Control Information) field of a Decoder Operation Reduction Request (DORR) message contains one or more FCI entries. These one or more FCI entries comprise for example the following syntax element represented in TABLE TAB1 (Syntax for dec_ops_reduction_req):

TABLE TAB1

|  | Size (bits) | Descriptor |
| --- | --- | --- |
| dec_ops_reduction_req | 8 | signed integer |

The syntax element dec_ops_reduction_req indicates a requested percentage of reduction of decoding operations relative to decoding operations since a last dec_ops_reduction_req was sent to a transmitter of a video content, or since a start of the video session, if no earlier dec_ops_reduction_req was sent. The percentage is expressed as a signed integer. A negative percentage means an increase of decoding operations. dec_ops_reduction_req is for example an integer in the interval [−100, 100].

In another embodiment, a syntax element dec_ops_red_req with a syntax represented in Table TAB2, can similarly be included in a DORR message along with syntax elements specific for each chosen mode. The syntax element dec_ops_red_req first 2 bits indicates the decoding power reduction mode type. Mode "0" indicates a requested percentage of reduction of decoding operations (dec_ops_reduction_req) signaled as a 6-bit signed integer. An actual decoding operations reduction percentage (DecOpsReductionReq) is calculated as below:

$$DecOpsReductionReq = 2 * dec\_ops\_reduction\_req \qquad \text{EQ. 1}$$

In mode "1", the decoding operations reduction is indicated by disabling some coding tools in the encoder. The syntax elements disable_loop_filters, disable_bi_prediction, disable_intra_in_B, disable_fracpel_filtering, disable_user_defined_tool_0, and disable_user_defined_tool_1 keep the same semantic as described above. The DORR message includes all or some of these syntax elements when mode "1" is indicated.

In mode "2", the decoding operations reduction is indicated by spatial scaling and temporal scaling factors.

TABLE TAB2

| | Size (bits) | Descriptor |
|---|---|---|
| dec_pow_reduction_type | 2 | unsigned integer |
| if (dec_pow_reduction_type = = 0) { | | |
|     dec_ops_reduction_req | 6 | signed integer |
| } | | |
| else if (dec_pow_reduction_type = = 1) { | | |
|     disable_loop_filters | 1 | unsigned integer |
|     disable_bi_prediction | 1 | unsigned integer |
|     disable_intra_in_B | 1 | unsigned integer |
|     disable_fracpel_filtering | 1 | unsigned integer |
|     disable_user_defined_tool_0 | 1 | unsigned integer |
|     disable_user_defined_tool_1 | 1 | unsigned integer |
| } | | |
| else if (dec_pow_reduction_type = = 2) { | | |
|     spatial_scale_factor | 3 | signed integer |
|     temporal_scale_factor | 3 | signed integer |
| } | | |

In accordance with section 7 of RFC 5104 (Codec Control Messages in the RTP Audio-Visual Profile with Feedback (AVPF) which defines SDP procedures for indicating and negotiating support for codec control messages (CCM) in SDP, the Decoder Operation Reduction Request (DORR) message can be defined in SDP as follow:

rtcp-fb-ccm-param = /SP "DORR";

Decoder Operation Reduction Request

In the following, we provide an example of capability negotiation. The following extend an example in section 7.3 of RFC-5104 with support for DORR messages. This allows sender and receiver to know at the time of establishing a streaming session that they can exchange DORR messages during a session. In other words, during the capability negotiation, the sender and the receiver negotiates a use of DORR messages. In that case, the SDP offer is as follows:

```
------------> Offer
    v=0
    o=alice 3203093520 3203093520 IN IP4 host.example.com
    s=Offer/Answer
    c=IN IP4 192.0.2.124
    m=audio 49170 RTP/AVP 0
    a=rtpmap:0 PCMU/8000
    m=video 51372 RTP/AVPF 98
    a=rtpmap:98 H263-1998/90000
    a=rtcp-fb:98 ccm tstr
    a=rtcp-fb:98 ccm fir
    a=rtcp-fb: * ccm tmmbr smaxpr=120
    a=rtcp-fb:98 ccm dorr
```

The answerer wishes to support the DORR messages (and not the FIR (Full Intra Request), TSTR (Temporal-Spatial Trade-off Request), TMMBR (Temporary Maximum Media Stream Bit Rate Request) messages as defined in RFC-5104):

```
<---------------- Answer
    v=0
    o=alice 3203093520 3203093524 IN IP4 otherhost.example.com
    s=Offer/Answer
    c=IN IP4 192.0.2.37
    m=audio 47190 RTP/AVP 0
    a=rtpmap:0 PCMU/8000
    m=video 53273 RTP/AVPF 98
    a=rtpmap:98 H263-1998/90000
    a=rtcp-fb:98 ccm dorr
``` or extending the basic example in the VVC RTP payload currently under definition in document RTP Payload Format for Versatile Video Coding (VVC), draft-ietf-avtcore-rtp-vvc-02 with FIR and DORR CCMs:

```
------------> Offer
    v=0
    o=alice xxxxx
    s=Offer/Answer
    m=video 49170 RTP/AVP 98
    a=rtpmap:98 H266/90000
    a=fmtp:98 profile-id=1;
        sprop-vps=<video parameter sets data>;
        sprop-sps=<sequence parameter set data>;
        sprop-pps=<picture parameter set data>;
        a=rtcp-fb:98 ccm fir
        a=rtcp-fb:98 ccm dorr
    <---------------- Answer
    v=0
    o=alice xxxxx
    s=Offer/Answer
    c=xxxx
    m=video 49170 RTP/AVP 98
    a=rtpmap:98 H266/90000
    a=rtcp-fb:98 ccm dorr
```

Figure 6:
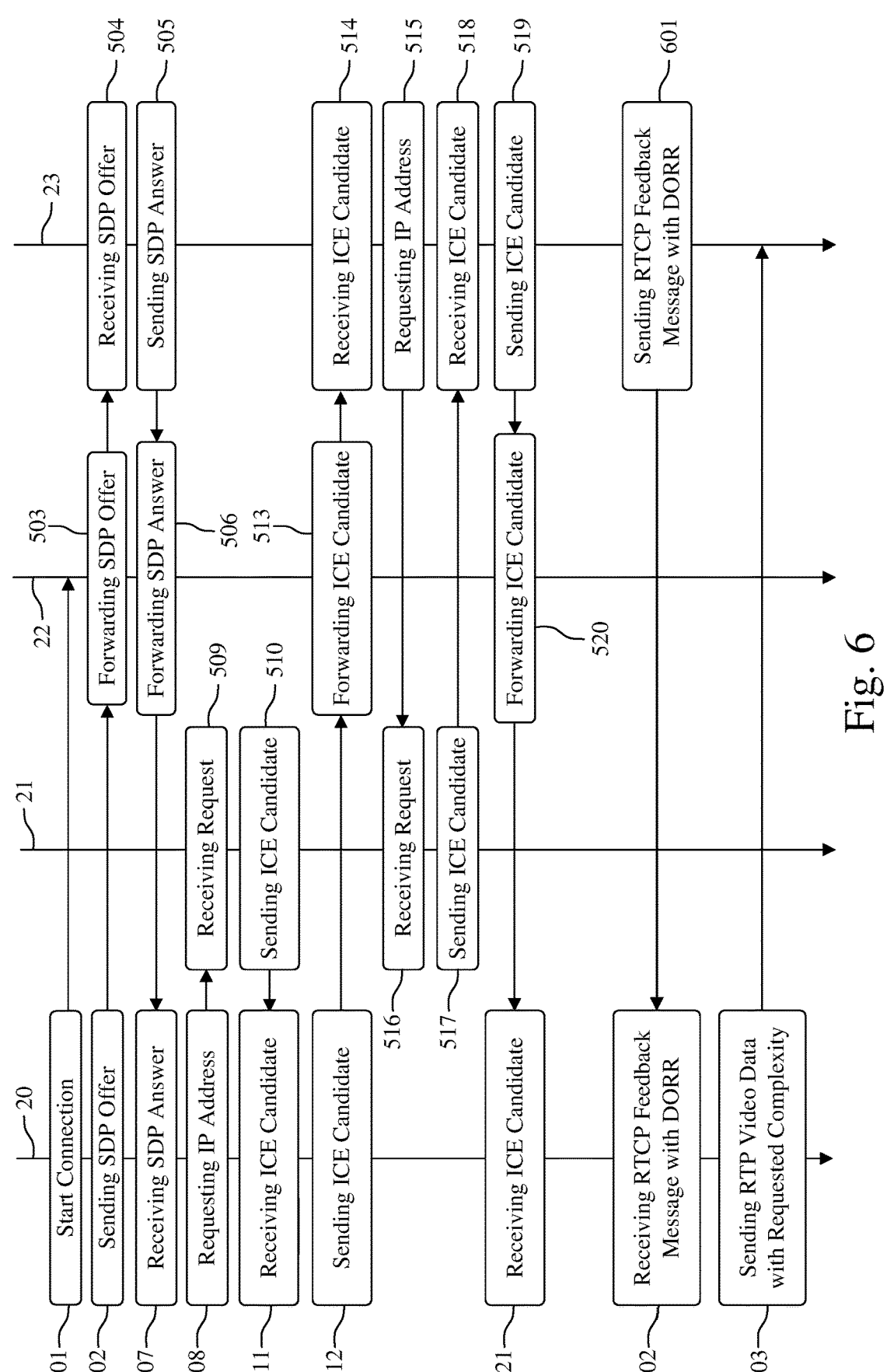
FIG. 6 provides the details about connection establishment between a server and a client using WebRTC session-based media streaming and DORR feedback message.

FIG. 6 provides details about the streaming session establishment process between a server and a client using WebRTC session-based media streaming and DORR feedback message.

Steps 501 to 521 are identical in FIG. 5 and FIG. 6.

In FIG. 6, the first peer 20 is a WebRTC server and the second peer 23 is a client. It is supposed here that a phase of capability negotiation has occurred between the first peer 20 and the second peer 23 and that the first peer 20 and the second peer 23 have agreed on the use of DORR messages.

In a step 601, the processing module 300 of the second peer 23 sends a DORR message to the first peer 20. The FCI field of a DORR feedback message contains one FCI entry. This FCI entry comprises a syntax element dec_ops_reduction_req indicating a percentage of reduction of 50%.

In a step 602, the processing module 300 of the first peer 20 receives the DORR message.

In a step 603, the processing module 300 of the first peer 20 generates a version of the requested media allowing obtaining the requested reduction of the decoding complexity on the second peer 23 side.

In a variant of the second embodiment, the first peer 20 and the second peer 23 agree on a use of DORR message. To do so, in the step 502, the first peer 20 sends to the second peer 23 via the signaling server 22 a SDP offer message that includes the indication that DORR feedback message is supported. In step 505, the second peer 23 responds with a SDP answer message signaling that it intends to use DORR feedback message during a session.

When the client wants a low complexity or high complexity stream, the client sends a RTCP DORR feedback message with a packet type value (PT) equal to "206", FMT equal to e.g. "16" and payload indicating a percentage reduction in decoding operations as shown in FIG. 6. A Live encoder present in the server/backend can encode the content with the requested decoding operations or a version of the content with corresponding power consumption characteristic and the webRTC server transmits the coded video data over RTP packets to the client using P2P channel.

In another embodiment, when a first peer with a live encoding capability receives a DORR message from a second peer, the first peer sends a Decoder operations reduction Notification (DORN) message to the second peer. The purpose of the DORN message is to notify a peer receiving this DORN message about a sending of a version of a content that requires a different power consumption corresponding to parameters specified in a DORR message. A DORN message can be viewed as a message allowing acknowledging a reception of a DORR message.

In an embodiment, the PSFB message is extended to allow a support of a CCM allowing controlling the power consumption of a decoder with RTCP. To do so, the field FMT of the PSFB message is given a specific value (for instance "17") to reserve that value for a new DORN payload-specific feedback message. In other words, the PFSB message can be viewed as a generic feedback message that can be specified using the field FMT.

In an embodiment, the FCI field of a DORN message contains one or more FCI entries. These one or more FCI entries comprise for example the syntax element represented in table TAB1 or as represented in table TAB2 with syntax elements specific for each chosen mode.

In an embodiment, for each DORR message received by a first peer from a second peer, a DORN FCI entry is sent in a DORN message by the first peer to the second peer.

In an embodiment, a single DORN message acknowledges multiple DORR messages using multiple FCI entries. Including an FCI for each peer having sent a DORR message allows each of these peers to determine that the sender of the content received the DORR message sent by this peer.

In an embodiment, if multiple DORR messages are received by a first peer from a second peer with several different sequence numbers, the first peer only responds to the DORR message containing the highest (modulo 256) sequence number. Note that the highest sequence number may be represented by a smaller integer value due to a wrapping of the field. For example, an algorithm for keeping track of the highest received sequence number for RTP packets disclosed Appendix A.1 of RFC3550 is used.

In an embodiment, a DORN message sent by a first peer includes the parameters mentioned in TABLE TAB2 and acknowledges several DORR messages, each DORR message originating from a different second peer. In that case, the values of the parameters of table TAB2 specified in the DORN message may be different from the values of the same parameters specified in each DORR message. Indeed, in a first example, the DORN message may represent a version of the content requested by the second peers that globally satisfies a majority of these second peers, but not necessarily each second peer individually.

In a second example, the first peer may apply a policy limiting the tools that can be deactivated or modified.

In an embodiment, a new line is inserted in an example of message disclosed in section 7.3 of RFC-5104 to indicate a support for DORN messages. This allows a sender peer and a receiver peer to know at the time of establishing a streaming session that they can exchange DORN messages during a session. In other words, during the capability negotiation, the sender peer and the receiver peer negotiate a use of DORN messages. In this embodiment, the SDP offer comprises the following additional line:

a=rtcp-fb: 98 ccm dorn

In a variant of the preceding embodiment, the additional line of the SDP offer comprises two additional parameters representing the two user defined coding tools specified by the parameters disable_user_defined_tool_0 and disable_user_defined_tool_1 in the FCI field of a DORR message:

a=rtcp-fb: 98 ccm dorn coding_tool1 coding_tool2

User defined coding tools specified in table TAB2 by disable_user_defined_tool_0 and disable_user_defined_tool_1 does not specify exactly which coding tool it is (as it is a "1" bit field) but only indicates a specific coding tool is "enabled" or "disabled". Which coding tools are used as tool "0" and tool "1" is negotiated through SDP. In other words, in SDP offer, two selected coding tools are negotiated as coding tool "0" and coding tool "1". Then the receiving peer sends a DORR message asking to enable or disable those negotiated coding tools. The sending peer receives a DORR message and informs the receiving peer about the corresponding changes in DORN message. The encoder in the sending peer may or may not adopt the requested changes and this information is indicated via the DORN message by setting the respective flags coding_tool1 and coding_tool2.

Figure 8:
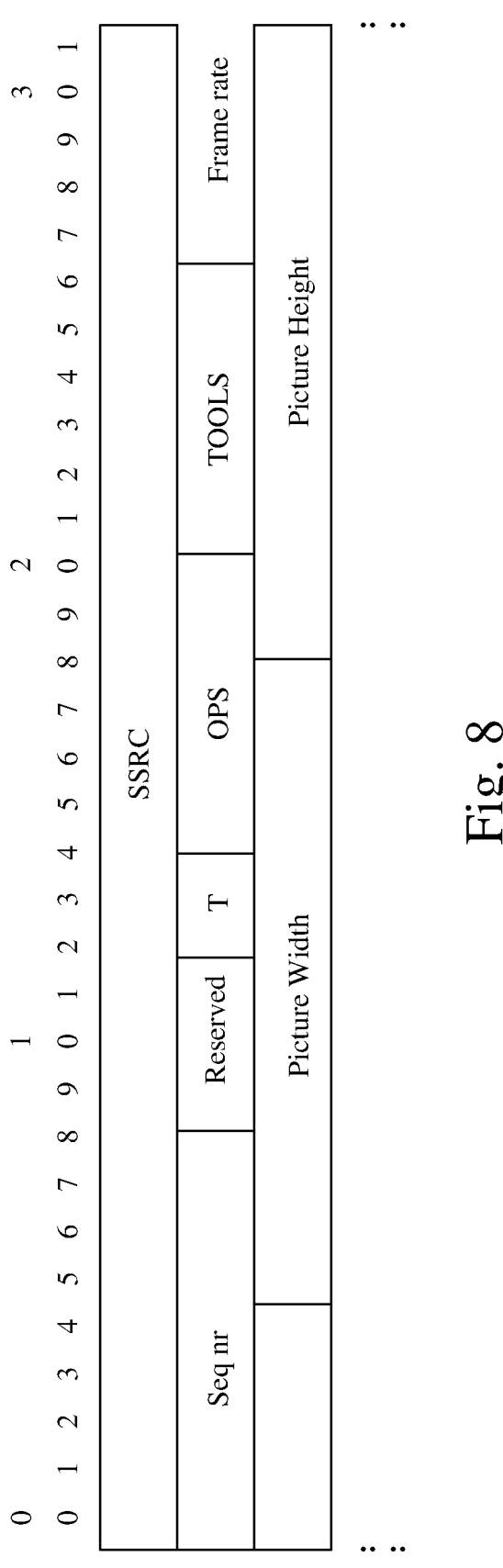

FIG. 8 illustrates schematically the content of a FCI (Feedback Control Information) field for DORN (Decoder operations reduction Notification) message.

The semantics of the fields provided in the FCI entry are as below:

T (2 bits): Decoding power reduction type. Currently 3 modes (i.e. types) are defined for expressing the required decoding operations percentage change at a decoding side. Type "0" indicates an absolute value of a decoding operations percentage change compared to a previous decoding operations. Type "1" indicates the decoding operations are changed based on an enabling or disabling of selected coding tools. Type "2" indicates the decoding operations are changed by adjusting the encoding framerate and/or video resolution.

OPS (6 bit): Decoding operations changed. When the Type field T value is "0" or "1", this field indicates a value of decoding operations changed compared to previous decoding operations. When the Type field T value is "2", this field is not defined and is set to "0". The decoding operations changed is an integer in the interval [−31, 32]. OPS values are derived using a total decoding operations percentage change and indicates the percentage of change of decoding operations compared to previous decoding operations by:

$$ops = d_{tops}/2,$$

where $d_{tops}$ is equal to total decoding operations percentage changed. A negative percentage means a decrease in decoding operations. Total decoding operations is an integer in the interval $[-62, 64]$ in steps of two.

Tools (6 bit): When the Type filed T value is "1", this "6" bit field represents the enabling or disabling of selected coding tools. When the Type field T value is "0" or "2", this field is not defined and is set to "0". When the loop filtering coding tool is off in an encoder to reduce the decoding operations, $1^{st}$ bit of the Tools field is set to "1" and otherwise is set to "0". When the bi-directional prediction coding tool is off in an encoder to reduce the decoding operations, $2^{nd}$ bit of the Tools field is set to "1" otherwise is set to "0". When usage of intra prediction in a B frame coding tool is off in an encoder to reduce the decoding operations, $3^{rd}$ bit of the Tools field is set to "1" otherwise is set to "0". When usage of fractional-pel interpolation filter coding tool is off in an encoder to reduce the decoding operations, $4^{th}$ bit of the Tools field is set to "1" otherwise is set to "0". The $5^{th}$ and $6^{th}$ bits represent the optional user defined coding tools that can be disabled in an encoder can disable to reduce decoder side operations. In a variant, one of the bits (e.g. the $5^{th}$ bit) is used to control intra prediction in P-frames. When the $5^{th}$ bit of the Tools field is equal to "1", intra prediction cannot be used in P-frames. When the $5^{th}$ bit of the Tools field is equal to "0", intra prediction can be used in P-frames. In a variant, one of the bits (e.g. the $6^{th}$ bit) of the Tools field is used to control bi-prediction in inter frames. When the $6^{th}$ bit of the Tools field is equal to "1", bi-prediction is not allowed and only uni-prediction can be used in inter frames. When the $6^{th}$ bit of the Tools field is equal to "0", bi-prediction can be used in inter frames.

Frame Rate (10 bits): frames per second. This field specifies a frame rate as defined in clause 5.3 of ISO/IEC 23001-11. An integer value between "1" and "1023" indicates the coding frame rate. A value of Frame Rate equal to "0" is illegal.

Picture Width (14 bits): picture width in luma samples. This field specifies a picture width as defined in clause 5.3 of ISO/IEC 23001-11. An integer value between "1" and "16383" indicates a coding picture width in the units of luma samples. A value of Picture Width equal to "0" is illegal.

Picture Height (14 bits): picture height in luma samples. This specifies the picture height as defined in clause 5.3 of ISO/IEC 23001-11. An integer value between "1" and "16383" indicates a coding picture height in the units of luma samples. A value of Picture Height equal to "0" is illegal.

Use with HLS (HTTP Live Streaming: RFC-8216 and RFC-8216Bis)

In the context of HLS, it can be also advantageous to provide information about the decoding complexity of a stream allowing the receiver to save power consumption and make adaptive streaming requests to the server based for example, on an available battery power. A third embodiment below addresses the context of HLS.

As a reminder, in HLS, a master playlist provides a set of variant streams, each of which describes a different version a same content. A Media Playlist contains a list of media segments, which, when played sequentially, will play the content. A variant stream includes a media playlist that specifies media encoded at a particular bit rate, in a particular format, and at a particular resolution for media containing video. The master playlist is provided by a server to a client to allow the client playing the content. During the playing, the client switches between different variant streams to adapt to network conditions. The client can also choose renditions based on user preferences. An objective of the third embodiment is to enrich the current process of HLS by allowing the client to also select variant streams in function of their decoding complexity.

To do so, several metrics are defined in the third embodiment.

A first metric is a video decoding complexity metric information dec_ops_ratio(i) indicating a percentage of decoding operations required by a $i^{th}$ variant of a content compared to the most complex version of the same content. dec_ops_ratio(i) is calculated as follows:

$$\text{dec\_ops\_ratio}(i) = \text{Floor}\left(\frac{NumDecOps(i)}{MaxNumDecOps} * 100\right) \qquad \text{EQ. 2}$$

MaxNumDecOps is the estimated number of decoding operations required for the most complex version of a video content. NumDecOps(i) is the number of decoding operations for the $i^{th}$ variant of the video content.

When a plurality of renditions of the video content are available, MaxNumDecOps value represents the estimated number of decoding operations required for the most complex variant of the video content with the same NAME attribute value in the EXT-X-MEDIA tag. The EXT-X-MEDIA tag is used in HLS to relate Media Playlists that contain alternative renditions of the same content. For example, three EXT-X-MEDIA tags can be used to identify audio-only Media Playlists that contain English, French, and Spanish renditions of the same content. Or, two EXT-X-MEDIA tags can be used to identify video-only Media Playlists that show two different camera angles.

In a first variant of the third embodiment, when alternate video renditions are available, NumDecOps (i) represents the estimated number of decoding operations required for the $i^{th}$ variant of the video content with the same NAME attribute value in the EXT-X-MEDIA tag.

The dec_ops_ratio value for the most complex variant of the video content is, for example, equal to "100".

The dec_ops_ratio value is for example signaled in the master playlist file using the optional CODING-COMPLEXITY attribute in the EXT-X-STREAM-INF tag when there are no alternate video renditions available as in the paragraph below:

```
#EXTM3U
#EXT-X-STREAM-INF:BANDWIDTH=1280000,AVERAGE-
BANDWIDTH=1000000,CODING-COMPLEXITY=50
http://example.com/low.m3u8
#EXT-X-STREAM-INF:BANDWIDTH=2560000,AVERAGE-
BANDWIDTH=2000000,CODING-COMPLEXITY=70
http://example.com/mid.m3u8
#EXT-X-STREAM-INF:BANDWIDTH=7680000,AVERAGE-
BANDWIDTH=6000000,CODING-COMPLEXITY=100
http://example.com/hi.m3u8
#EXT-X-STREAM-INF:BANDWIDTH=65000,CODECS="mp4a.40.5"
http://example.com/audio-only.m3u8
```

In a variant of the third embodiment, the dec_ops_ratio value is signaled in the master playlist file using the optional CODING-COMPLEXITY attribute in the EXT-X-MEDIA tag when there are alternate renditions available as below:

```
.#EXTM3U
#EXT-X-MEDIA:TYPE=VIDEO,GROUP-ID="low",CODING-COMPLEXITY=50,NAME="Main", \
DEFAULT=YES,URI="low/main/audio-video.m3u8"
#EXT-X-MEDIA:TYPE=VIDEO,GROUP-ID="low",CODING-
COMPLEXITY=53,NAME="Centerfield", \ DEFAULT=NO,URI="low/centerfield/audio-video.m3u8"
#EXT-X-MEDIA:TYPE=VIDEO,GROUP-ID="low",CODING-COMPLEXITY=55,NAME="Dugout", \
DEFAULT=NO,URI="low/dugout/audio-video.m3u8"
#EXT-X-STREAM-INF:BANDWIDTH=1280000,CODECS="...",VIDEO="low"
low/main/audio-video.m3u8
#EXT-X-MEDIA:TYPE=VIDEO,GROUP-ID="mid",CODING-COMPLEXITY=70,NAME="Main", \
DEFAULT=YES,URI="mid/main/audio-video.m3u8"
#EXT-X-MEDIA:TYPE=VIDEO,GROUP-ID="mid",CODING-
COMPLEXITY=75,NAME="Centerfield", \ DEFAULT=NO,URI="mid/centerfield/audio-video.m3u8"
#EXT-X-MEDIA:TYPE=VIDEO,GROUP-ID="mid",CODING-COMPLEXITY=78,NAME="Dugout", \
DEFAULT=NO,URI="mid/dugout/audio-video.m3u8"
#EXT-X-STREAM-INF:BANDWIDTH=2560000,CODECS="...",VIDEO="mid"
mid/main/audio-video.m3u8
#EXT-X-MEDIA:TYPE=VIDEO,GROUP-ID="hi",CODING-COMPLEXITY=100,NAME="Main", \
DEFAULT=YES,URI="hi/main/audio-video.m3u8"
#EXT-X-MEDIA:TYPE=VIDEO,GROUP-ID="hi",CODING-COMPLEXITY=100,NAME="Centerfield",
\ DEFAULT=NO,URI="hi/centerfield/audio-video.m3u8"
#EXT-X-MEDIA:TYPE-VIDEO,GROUP-ID="hi",CODING-COMPLEXITY=100,NAME="Dugout", \
DEFAULT=NO,URI="hi/dugout/audio-video.m3u8"
#EXT-X-STREAM-INF:BANDWIDTH=7680000,CODECS="...",VIDEO="hi"
hi/main/audio-video.m3u8
```

A second metric is a decoding complexity metric information dec_ops_ratio_segment(i) indicating the percentage of decoding operations required for the $i^{th}$ variant of a segment compared to the corresponding segment of the most complex variant of the same video content. dec_ops_ratio_segment(i) is calculated for each media segment as below:

$$\text{dec\_ops\_ratio\_segment}(i) = \text{Floor}\left(\frac{NumDecOpsSegment(i)}{\text{Max} NumDecOpsSegment} * 100\right) \quad \text{EQ. 3}$$

MaxNumDecOpsSegment is an estimated number of decoding operations required for a segment of the most complex video content variant. NumDecOpsSegment(i) is the number of operations for the $i^{th}$ variant of the same segment.

In a variant, when alternate video renditions are available, MaxNumDecOpsSegment value represents the estimated number of decoding operations required for the segment of the most complex variant of the video content with same NAME attribute value in the EXT-X-MEDIA tag.

In a variant, when alternate video renditions are available, NumDecOpsSegment(i) value represents the estimated number of decoding operations required for the current segment from the $i^{th}$ variant of the video content with same NAME attribute value in EXT-X-MEDIA tag.

The dec_ops_ratio_segment value for all segments of the most complex video stream is for example equal to "100".

In an embodiment, the dec_ops_ratio_segment value is signaled in the media playlist file for each media segment by using the optional COMPLEXITY-RATIO attribute in EXT-X-COMPLEXITY-INFO tag.

A third metric is a metric dec_ops_reduction_ratio_from_prev(i) indicating the percentage by which decoding operations are reduced in the current video segment compared to the previous video segment for the $i^{th}$ variant of the video content. A negative value means an increase in decoding operations:

$$\text{dec\_ops\_reduction\_ratio\_from\_prev}(i) = \quad \text{EQ. 4}$$
$$\text{Floor}\left(\frac{NumDecOpsPrevSegment(i) - NumDecOpsSegment(i)}{NumDecOpsSegment(i)} * 100\right)$$

If the current video segment is the first segment of a period, then dec_ops_reduction_ratio_from_prev(i)=0.

NumDecOpsPrevSegment(i) is the estimated number of decoding operations required for the $i^{th}$ variant of the previous video segment. If the current video segment is the first segment, then NumDecOpsPrevSegment(i)=NumDecOpsSegment(i).

In a embodiment, the dec_ops_reduction_ratio_from_prev value is signaled in the media playlist file for each media segment as a COMPLEXITY-REDUCTION attribute in the EXT-X-COMPLEXITY-INFO tag.

An example of media playlist file of a low complexity stream with the COMPLEXITY-REDUCTION and the COMPLEXITY-RATIO attributes in the EXT-X-COMPLEXITY-INFO tag for each media segment is presented below:

```
#EXTM3U
#EXT-X-TARGETDURATION:10
#EXT-X-VERSION:3
#EXT-X-COMPLEXITY-INFO:COMPLEXITY-REDUCTION=0,COMPLEXITY-
RATIO=50
#EXTINF:9.009,
http://media.example.com/first.ts
#EXT-X-COMPLEXITY-INFO:COMPLEXITY-REDUCTION=20,COMPLEXITY-
RATIO=55
#EXTINF:9.009,
http://media.example.com/second.ts
```

-continued

```
#EXT-X-COMPLEXITY-INFO:COMPLEXITY-REDUCTION=10,COMPLEXITY-
RATIO=52
#EXTINF:3.003,
http://media.example.com/third.ts
#EXT-X-ENDLIST
```

The decoder operation reduction ratio values (decoder operations of a sample from a variant stream (i.e. a stream corresponding version of the content different from the most complex version) compared with the decoder operations of the same sample from most complex variant stream (i.e. from a stream corresponding to the most complex version of the content) and decoder operations reduced from previous sample of same variant stream) of each sample are stored in a specific metadata file "ABC.mp4m" (one metadata file for each segment) using the format specified in ISO/IEC 23001-10. As a reminder, a sample consists of multiple NAL (Network Abstraction Layer) units of a video frame. The metadata files created for a video variant stream is considered as a metadata variant stream.

A metadata variant stream may be part of a media playlist file. An example media playlist file with metadata segments is as below:

```
#EXTM3U
#EXT-X-TARGETDURATION:10
#EXT-X-VERSION:3
#EXTINF:9.009,
http://media.example.com/first.mp4m
#EXTINF:9.009,
http://media.example.com/second.mp4m
#EXTINF:3.003,
http://media.example.com/third.mp4m
#EXT-X-ENDLIST
```

In another embodiment, the available metadata variant streams information may be signaled within the master playlist using a EXT-X-MEDIA tag and a TYPE attribute with value equal to METADATA string along with a EXT-X-STREAM-INF tag with METADATA attribute as below:

```
#EXT-X-MEDIA:TYPE=METADATA,GROUP-ID="low",NAME="Main",\
DEFAULT=YES,URI="low/main/metadata.m3u8"
#EXT-X-STREAM-
INF:BANDWIDTH=1280000,CODECS="...",METADATA="low"low/main/
metadata.m3u8
```

The example master playlist with alternate video renditions, variant streams and metadata streams is as below.

```
#EXTM3U
#EXT-X-MEDIA:TYPE=VIDEO,GROUP-ID="low",NAME="Main", \
    DEFAULT=YES,URI="low/main/audio-video.m3u8"
#EXT-X-MEDIA:TYPE=METADATA,GROUP-ID="low",NAME="Main", \
    DEFAULT=YES,URI="low/main/metadata.m3u8"
#EXT-X-MEDIA:TYPE=VIDEO,GROUP-ID="low",NAME="Centerfield", \
    DEFAULT=NO,URI="low/centerfield/audio-video.m3u8"
#EXT-X-MEDIA:TYPE=METADATA,GROUP-ID="low",NAME="Centerfield", \
    DEFAULT=NO,URI="low/centerfield/metadata.m3u8"
#EXT-X-MEDIA:TYPE=VIDEO,GROUP-ID="low",NAME="Dugout", \
    DEFAULT=NO,URI="low/dugout/audio-video.m3u8"
#EXT-X-MEDIA:TYPE=METADATA,GROUP-ID="low",NAME="Dugout", \
    DEFAULT=NO,URI="low/dugout/metadata.m3u8"
#EXT-X-STREAM-INF:BANDWIDTH=1280000,CODECS="...",VIDEO="low"
low/main/audio-video.m3u8
#EXT-X-STREAM-
INF:BANDWIDTH=1280000,CODECS="...",METADATA="low"
low/main/metadata.m3u8
#EXT-X-MEDIA:TYPE=VIDEO,GROUP-ID="mid",NAME="Main", \
    DEFAULT=YES,URI="mid/main/audio-video.m3u8"
#EXT-X-MEDIA:TYPE=METADATA,GROUP-ID="mid",NAME="Main", \
    DEFAULT=YES,URI="mid/main/metadata.m3u8"
#EXT-X-MEDIA:TYPE=VIDEO,GROUP-ID="mid",NAME="Centerfield", \
    DEFAULT=NO,URI="mid/centerfield/audio-video.m3u8"
#EXT-X-MEDIA:TYPE=METADATA,GROUP-ID="mid",NAME="Centerfield", \
    DEFAULT=NO,URI="mid/centerfield/metadata.m3u8"
#EXT-X-MEDIA:TYPE=VIDEO,GROUP-ID="mid",NAME="Dugout", \
    DEFAULT=NO,URI="mid/dugout/audio-video.m3u8"
#EXT-X-MEDIA:TYPE=METADATA,GROUP-ID="mid",NAME="Dugout", \
    DEFAULT=NO,URI="mid/dugout/metadata.m3u8"
#EXT-X-STREAM-INF:BANDWIDTH=2560000,CODECS="...",VIDEO="mid"
mid/main/audio-video.m3u8
#EXT-X-STREAM-
INF:BANDWIDTH=2560000,CODECS="...",METADATA="mid"
mid/main/metadata.m3u8
```

When it receives the first, second and third metric in a master playlist or a media playlist, a client can determine which rendition of the video content it prefers in function of a desired decoding complexity. Again, when receiving the master playlist and/or the media playlist the client receives information allowing controlling a power consumption of its decoding process. The information allowing controlling a power consumption of the decoding process provides information representative of the decoding complexity of a plurality of versions of a same video content. Note that the reception of the master playlist file or a media playlist file by the client is a step of a streaming session establishment process, said master playlist or media playlist files being received either from a server storing the plurality of versions of the video content or from a CDN (content delivery network) storing the plurality of versions of the video content.

We described above a number of embodiments. Features of these embodiments can be provided alone or in any combination. Further, embodiments can include one or more of the following features, devices, or aspects, alone or in any combination, across various claim categories and types:

A bitstream or signal that includes one or more of the described syntax elements, parameters, or values or variations thereof.

Creating and/or transmitting and/or receiving and/or decoding a bitstream or signal that includes one or more of the described syntax elements, parameters, or values or variations thereof.

A TV, game console, smartphone, tablet, or other electronic device that performs at least one of the embodiments described.

A TV, game console, smartphone, tablet, or other electronic device that performs at least one of the embodiments described, and that displays (e.g. using a monitor, screen, or other type of display) a resulting picture.

A TV, game console, smartphone, tablet, or other electronic device that tunes (e.g. using a tuner) a channel to receive a signal including an encoded video stream, and performs at least one of the embodiments described.

A TV, set-top box, smartphone, tablet, or other electronic device that receives (e.g. using an antenna) a signal over the air that includes a stream, and performs at least one of the embodiments described.

A TV, set-top box, smartphone, tablet, or other electronic device that executes a streaming application using at least one of the embodiments described.

The invention claimed is:

1. A method, in a first device, comprising:
transmitting at least one decoder operation reduction request (DORR) message to a second device, the DORR message comprising a field indicating a value of decoding operations change compared to previous decoding operations or a field, wherein each bit of the field indicates whether at least one coding tool is enabled or disabled;
receiving, from the second device, a decoder operation reduction notification (DORN) message acknowledging receipt of the DORR message, the DORN message comprising: (i) a type field T representative of a decoding power reduction type; (ii) an OPS field indicating a value of decoding operations change compared to previous decoding operations when the type field T indicates a decoding operations change mode; and (iii) a TOOLS field when the type field T indicates a tool-based mode, wherein each bit of the TOOLS field indicates enabling or disabling of a specific coding tool; and
receiving, from the second device, a video stream generated according to the OPS field when the type field T indicates a decoding operation change mode, and according to the TOOLS field when the type field T indicates a tool-based mode.

2. The method of claim 1, wherein transmitting at least one DORR message comprises transmitting a plurality of DORR messages with different sequence numbers and wherein receiving, from the second device, a DORN message comprises receiving a DORN message acknowledging only the DORR message having a highest sequence number among the multiple DORR messages.

3. A method, in a first device, comprising:
receiving at least one decoder operation reduction request (DORR) message from a second device, the DORR message comprising a field indicating a value of decoding operations change compared to previous decoding operations or a field, wherein each bit of the field indicates whether at least one coding tool is enabled or disabled;
acknowledging receipt of the DORR message by transmitting, to the second device, a decoder operation reduction notification (DORN) message, the DORN message comprising a Feedback Control Information (FCI) entry comprising: (i) a type field T representative of a decoding power reduction type; (ii) an OPS field indicating a value of decoding operations change compared to previous decoding operations when the type field T indicates a decoding operations change mode; and (iii) a TOOLS field when the type field T indicates a tool-based mode, wherein each bit of the field indicates enabling or disabling of a specific coding tool; and
transmitting, to the second device, a video stream generated according to the OPS field when the type field T indicates a decoding operation change mode, and according to the TOOLS field when the type field T indicates a tool-based mode.

4. The method of claim 3, wherein receiving at least one DORR message comprises receiving DORR messages from a plurality of devices and wherein acknowledging receipt of the DORR messages comprises transmitting a single DORN message having multiple FCI entries, each FCI entry corresponding to a respective device that sent a DORR message.

5. The method of claim 3, wherein receiving at least one DORR message comprises receiving multiple DORR messages with different sequence numbers from the second device and wherein acknowledging receipt of the DORR messages comprises transmitting a DORN message acknowledging only the DORR message having a highest sequence number among the multiple DORR messages received from the second device.

6. A first device, comprising:
one or more processors and at least one memory coupled to the one or more processors, wherein the one or more processors are configured to:
transmit at least one decoder operation reduction request (DORR) message to a second device, the DORR message comprising a field indicating a value of decoding operations change compared to previous decoding operations or a field, wherein each bit of the field indicates whether at least one coding tool is enabled or disabled;

receive, from the second device, a decoder operation reduction notification (DORN) message acknowledging receipt of the DORR message, the DORN message comprising: (i) a type field T representative of a decoding power reduction type; (ii) an OPS field indicating a value of decoding operations change compared to previous decoding operations when the type field T indicates a decoding operations change mode; and (iii) a TOOLS field when the type field T indicates a tool-based mode, wherein each bit of the TOOLS field indicates enabling or disabling of a specific coding tool; and receive, from the second device, a video stream generated according to the OPS field when the type field T indicates a decoding operation change mode, and according to the TOOLS field when the type field T indicates a tool-based mode.

7. The first device of claim 6, wherein to transmit at least DORR message comprises to transmit at a plurality of DORR messages with different sequence numbers and wherein to receive, from the second device, a DORN message comprises to receive a DORN message acknowledging only the DORR message having a highest sequence number among the multiple DORR messages.

8. A first device, comprising:

one or more processors and at least one memory coupled to the one or more processors, wherein the one or more processors are configured to:

receive at least one decoder operation reduction request (DORR) message from a second device, the DORR message comprising a field indicating a value of decoding operations change compared to previous decoding operations or a field, wherein each bit of the field indicates whether at least one coding tool is enabled or disabled;

acknowledge receipt of the DORR message by transmitting, to the second device, a decoder operation reduction notification (DORN) message, the DORN message comprising a Feedback Control Information (FCI) entry comprising: (i) a type field T representative of a decoding power reduction type; (ii) an OPS field indicating a value of decoding operations change compared to previous decoding operations when the type field T indicates a decoding operations change mode; and (iii) a TOOLS field when the type field T indicates a tool-based mode, wherein each bit of the field indicates enabling or disabling of a specific coding tool; and transmit, to the second device, a video stream generated according to the OPS field when the type field T indicates a decoding operation change mode, and according to the TOOLS field when the type field T indicates a tool-based mode.

9. The first device of claim 8, wherein to receive at least one DORR message comprises to receive DORR messages from a plurality of devices and wherein to acknowledge receipt of the DORR messages comprises to transmit a single DORN message having multiple FCI entries, each FCI entry corresponding to a respective device that sent a DORR message.

10. The first device of claim 8, wherein to receive at least one DORR message comprises to receive multiple DORR messages with different sequence numbers from the second device and wherein to acknowledge receipt of the DORR messages comprises to transmit a DORN message acknowledging only the DORR message having a highest sequence number among the multiple DORR messages received from the second device.

* * * * *